(12) United States Patent
Jiang et al.

(10) Patent No.: US 7,369,633 B2
(45) Date of Patent: May 6, 2008

(54) METHOD AND APPARATUS FOR PROVIDING CARRIER SYNCHRONIZATION IN DIGITAL BROADCAST AND INTERACTIVE SYSTEMS

(75) Inventors: Yimin Jiang, Rockville, MD (US); Feng-Wen Sun, Germantown, MD (US); Lin-Nan Lee, Potomac, MD (US); Neal Becker, Frederick, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 718 days.

(21) Appl. No.: 10/842,325

(22) Filed: May 10, 2004

(65) Prior Publication Data

US 2004/0252229 A1 Dec. 16, 2004

Related U.S. Application Data

(60) Provisional application No. 60/482,111, filed on Jun. 24, 2003, provisional application No. 60/482,117, filed on Jun. 24, 2003, provisional application No. 60/478,376, filed on Jun. 13, 2003.

(51) Int. Cl.
*H04L 7/00* (2006.01)
(52) U.S. Cl. ............... 375/354; 375/326; 375/327; 375/362; 375/368; 370/503; 704/503
(58) Field of Classification Search ........... 375/371, 375/326, 327
See application file for complete search history.

(56) References Cited

U.S. PATENT DOCUMENTS 4,613,825 A * 9/1986 Bickley et al. ............... 331/4

| 5,241,549 A | 8/1993 | Knowles et al. |
| 6,493,335 B1 | 12/2002 | Darcie et al. |
| 6,518,892 B2 * | 2/2003 | Shen et al. ............ 341/50 |
| 6,560,303 B1 | 5/2003 | Fan et al. |

(Continued)

FOREIGN PATENT DOCUMENTS

EP  1 059 786 A1  12/2000

(Continued)

OTHER PUBLICATIONS

"Open-Loop Tanlock Carrier Recovery Structure for BPSK and it's Performance" By Pooi Yuen Kam,Senior Member,IEEE, 1995 IEEE.*

(Continued)

*Primary Examiner*—Shuwang Liu
*Assistant Examiner*—Dhaval V Patel

(57) ABSTRACT

An approach is provided for supporting carrier synchronization in a digital broadcast and interactive system. A carrier synchronization module receives one or more signals representing a frame that includes one or more overhead fields (e.g., preamble and optional pilot blocks and one or multiple segments separated by pilot blocks). The module estimates carrier frequency and phase on a segment by segment basis and tracks frequency between segments. Carrier phase of the signal is estimated based upon the overhead field. Estimates carrier phase of random data field are determined based upon the estimated phase values from the overhead fields, and upon both the past and future data signals. Further, the frequency of the signal is estimated based upon the overhead fields and/or the random data field. The above arrangement is particularly suited to a digital satellite broadcast and interactive system.

29 Claims, 17 Drawing Sheets

U.S. PATENT DOCUMENTS

| | | | |
|---|---|---|---|
| 6,631,174 | B1 | 10/2003 | Asahara et al. |
| 6,721,299 | B1 | 4/2004 | Song |
| 6,879,602 | B1 | 4/2005 | Sugita et al. |
| 7,079,574 | B2 * | 7/2006 | Rafie et al. ................. 375/232 |
| 7,136,445 | B2 * | 11/2006 | Houtman ................... 375/375 |
| 2002/0064240 | A1 | 5/2002 | Joshi et al. |

FOREIGN PATENT DOCUMENTS

JP      05-244144      9/1993

OTHER PUBLICATIONS

"Orthoganal Frequency Divison Multiplex Synchronization Technique for Frequency-Selective Fading Channels" by Thomas Keller. IEEE Jounral on Selected Areas in Communications, vol. 19, No. 6, Jun. 2001.*

XP-000951366, "Data-Aided ML Parameter Estimators For PSK Burst Modems And Their Systolic VLSI Implementations", Yimin Jiang, Farhad B. Berahrami, Wen-Chun Ting, Robert L. Richmond, and John S. Baras, pp. 2177-2182, 1999.

94253444.6, ABSTRACT/ZUSAMMENFASSUNG/ABREGE.

* cited by examiner

METHOD AND APPARATUS FOR PROVIDING CARRIER SYNCHRONIZATION IN DIGITAL BROADCAST AND INTERACTIVE SYSTEMS

RELATED APPLICATIONS

This application claims the benefit of the earlier filing date under 35 U.S.C. § 119(e) of U.S. Provisional Application Ser. No. 60/478,376, filed Jun. 13, 2003, titled "Framing and Synchronization for Digital Satellite Broadcasting and Interactive Services," U.S. Provisional Application Ser. No. 60/482,111, filed Jun. 24, 2003, titled "Framing and Synchronization for Digital Satellite Broadcasting and Interactive Services," and U.S. Provisional Application Ser. No. 60/482,117, filed Jun. 24, 2003, titled "Framing Structure and Acquisition Method for Rapid Synchronization"; the entireties of which are incorporated herein by reference.

FIELD OF THE INVENTION

The present invention relates to communication systems, and more particularly to digital broadcast systems.

BACKGROUND OF THE INVENTION

Broadcast systems have embraced the demand for high quality transmissions made possible by digital technology. The digital revolution has transformed the delivery of broadband services, including audio and video programming as well as data transmission. Satellite communication systems have emerged as a viable solution for supporting such broadband services. As such, power and bandwidth efficient modulation and coding are highly desirable for satellite communications systems to provide reliable communication across noisy communication channels. In broadcast applications supported by such systems, continuous mode modems are widely used. Codes that perform well in low signal-to-noise (SNR) environments are at odds with these modems with respect to synchronization (e.g., carrier phase and carrier frequency).

Conventional digital broadcast systems require use of additional training symbols beyond that of the normal overhead bits in a frame structure for their synchronization processes. The increase in overhead is particularly required when low Signal-to-Noise (SNR) is low; such an environment is typical when high performance codes are used conjunction with high order modulation. Traditionally, continuous mode modems utilize a feedback control loop to acquire and track carrier frequency and phase. In this synchronization process, the FEC (Forward Error Correction) coded data fields, e.g., preambles of a block code, which contain known data symbols, are simply ignored. Such conventional approaches that are purely based on feedback control loops are prone to strong Radio Frequency (RF) phase noise and thermal noise, causing high cycle slip rates and an error floor on the overall receiver performance. Thus these approaches are burdened by increased overhead in terms of training symbols for certain performance target, in addition to limited acquisition range and long acquisition time. Further, these conventional synchronization techniques are dependent on the particular modulation scheme, thereby hindering flexibility in use of modulation schemes.

Therefore, there is a need for a digital communication system that provides synchronization immune to phase noise and thermal noise. There is also a need for a carrier synchronization approach that is simple to implement and incurs as few training symbols as possible. There is also a need to provide a synchronization technique that is flexible as to provide modulation independence.

SUMMARY OF THE INVENTION

These and other needs are addressed by the present invention, wherein an approach for providing carrier synchronization in a digital broadcast and interactive system utilizing Low Density Parity Check (LDPC) codes and higher order modulation schemes. Unlike conventional continuous mode modems, the carrier synchronization method estimates carrier frequency and phase on a segment by segment basis, and continuously tracks carrier frequency between segments. The preamble of an FEC (Forward Error Correction) frame and optional pilot blocks (i.e., aggregated pilot symbols) which assist carrier synchronization, serve as the segment boundaries. In an exemplary embodiment, a physical layer frame includes a preamble, which can be used to assist with carrier synchronization, and an FEC codeword when no extra pilot symbols are needed. Alternatively, a pilot symbol insertion process divides the FEC codeword into multiple code segments, and inserts a pilot block in form of a unique word (UW) before each code segment of the physical layer frame. The preamble and optional pilot blocks serve as a training block. The carrier synchronization process utilizes the training block to estimate carrier frequency and phase, and reinitializes the phase tracking loop for each new segment. The frequency acquisition process involves computing an autocorrelation of a data-removed continuous wave (CW) signal. The carrier frequency of the received signal is estimated based on a weighted sum of the unwrapped phase of the accumulated autocorrelation values. With respect to frequency tracking, a feed-forward structure is implemented to generate estimates and to update the carrier frequency once per LDPC frame based on the phase estimates from the training block (i.e., preamble and/or UW). For phase tracking, a Two-Sweep Phase Locked Loop (PLL) architecture with a Maximum Likelihood (ML) phase detector is utilized. The Two-Sweep PLL tracks carrier phase on a segment by segment basis to estimate carrier phase based on both the past and future samples by sweeping the segment of data from both the forward and reverse directions. A segment can be a whole FEC codeword when no pilot blocks are present, or a code segment when pilot blocks are inserted. The above arrangement advantageously reduces the need to introduce additional overhead for carrier synchronization, drastically reduces the cycle slip rate and limits its error-propagating impact, and operates well in low Signal-to-Noise Ratio (SNR) environments, providing good immunity against thermal noise and phase noise. Additionally, the frequency estimation process provides a large frequency acquisition range and short acquisition time.

According to one aspect of an embodiment of the present invention, a method of providing carrier synchronization in a digital broadcast and interactive system is disclosed. The method includes receiving a frame transmitted according to a carrier signal, wherein the frame includes one or more segments separated by a plurality of overhead fields, and the overhead fields include a pilot block that is selectively inserted into the frame to aid carrier synchronization of the carrier signal. The method also includes generating estimated phase values associated with the carrier signal based on the overhead fields. The method also includes estimating phase of the carrier signal associated with a random data field within the segment based upon the estimated phase values and upon past samples of the carrier signal and future samples of the carrier signal. The method further includes estimating frequency of the carrier signal based upon the overhead fields or the random data field, wherein the estimating steps are performed on the frame on a segment by segment basis.

According to another aspect of an embodiment of the present invention, a method for providing carrier synchronization in support of digital broadcast and interactive services over a satellite network is disclosed. The method includes receiving a frame over a satellite communication channel, the frame including a preamble and a plurality of code segments having corresponding unique words as training symbols. The method also includes estimating phase information corresponding to the frame based upon one of the preamble, the unique words, and a combination of the preamble and the unique words. Further, the method includes estimating frequency information corresponding to the frame based upon the estimated phase.

According to another aspect of an embodiment of the present invention, a method of supporting carrier synchronization in a digital broadcast and interactive system is disclosed. The method includes determining whether an insertion point coincides with position of a preamble field of a frame, wherein the insertion point is based on a predetermined number of symbols of the frame. Also, the method includes inserting a pilot block for aiding carrier synchronization at the insertion point if the position of the frame does not coincide with the preamble field.

According to another aspect of an embodiment of the present invention, a transmitter for supporting carrier synchronization in a digital broadcast and interactive system is disclosed. The transmitter includes means for determining whether an insertion point coincides with position of a preamble field of a frame, wherein the insertion point is based on a predetermined number of symbols of the frame. Also, the transmitter includes inserting a pilot block for aiding carrier synchronization at the insertion point if the position of the frame does not coincide with the preamble field.

According to yet another aspect of an embodiment of the present invention, an apparatus for supporting carrier synchronization in a digital broadcast and interactive system is disclosed. The apparatus includes a mixer configured to receive a Low Density Parity Check (LDPC) encoded signal. The apparatus also includes a first phase estimator configured to estimate phase associated with a training block within the signal; and a frequency estimator coupled to the first phase estimator. The frequency estimator outputs a frequency estimate based on the phase estimate. The apparatus further includes a second phase estimator coupled to the first phase estimator configured to generate a final phase estimate.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for efficiently providing carrier synchronization in a digital broadcast and interactive system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
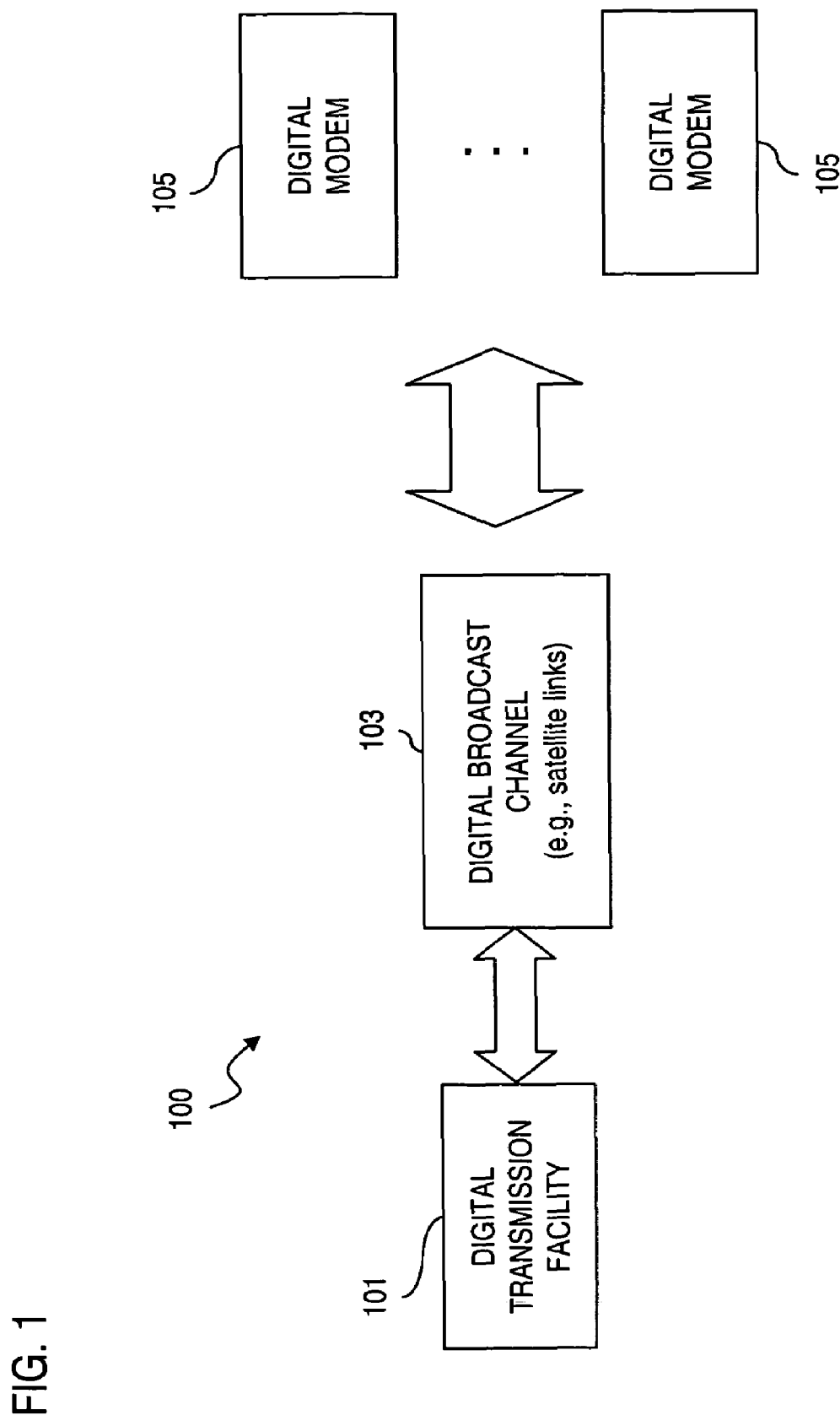
FIG. 1 is a diagram of a digital broadcast system configured to utilize Low Density Parity Check (LDPC) codes, according to an embodiment of the present invention.

FIG. 1 is a diagram of a digital broadcast system configured to utilize Low Density Parity Check (LDPC) codes, according to an embodiment of the present invention. The digital communications system 100 includes a digital transmission facility 101 that generates signal waveforms for broadcast across a communication channel 103 to one or more digital modems 105. According to one embodiment of the present invention, the communication system 100 is a satellite communication system that supports, for example, audio and video broadcast services as well as interactive services. Interactive services include, for example, electronic programming guides (EPGs), high-speed internet access, interactive advertising, telephony, and email services. These interactive services can also encompass such television services as Pay Per View, TV Commerce, Video On Demand, Near Video On Demand and Audio On Demand services. In this environment, the modems 105 are satellite modems.

These modems 105 achieve carrier synchronization by examining the preambles and/or unique words (UW) that are embedded in broadcast data frame structures (shown in FIG. 4), thereby reducing the use of additional overhead specifically designated for training purposes. The digital modems 105 are more fully described below with respect to FIG. 3.

In this discrete communications system 100, the transmission facility 101 produces a discrete set of possible messages representing media content (e.g., audio, video, textual information, data, etc.); each of the possible messages has a corresponding signal waveform. These signal waveforms are attenuated, or otherwise altered, by communications channel 103. To combat the noise channel 103, the transmission facility 101 utilizes LDPC codes.

The LDPC codes that are generated by the transmission facility 101 enables high speed implementation without incurring any performance loss. These structured LDPC codes output from the transmission facility 101 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit any sign of error floor.

According to one embodiment of the present invention, the transmission facility 101 generates, using a relatively simple encoding technique as explained below in FIG. 2, LDPC codes based on parity check matrices (which facilitate efficient memory access during decoding) to communicate with the satellite modem 105.

Figure 2:
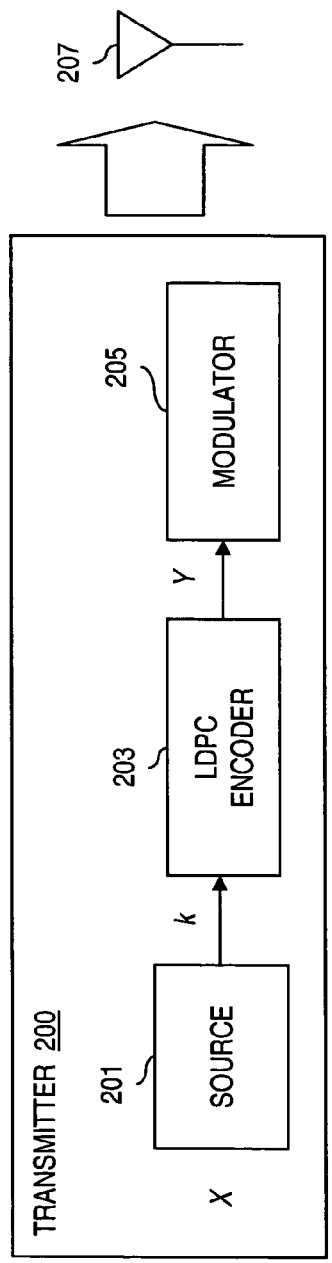
FIG. 2 is a diagram of an exemplary transmitter employed in the digital transmission facility of the system of FIG. 1.

FIG. 2 is a diagram of an exemplary transmitter employed in the digital transmission facility of the system of FIG. 1. A transmitter 200 is equipped with an LDPC encoder 203 that accepts input from an information source 201 and outputs coded stream of higher redundancy suitable for error correction processing at the receiver 105. The information source 201 generates k signals from a discrete alphabet, X. LDPC codes are specified with parity check matrices. On the other hand, encoding LDPC codes require, in general, specifying the generator matrices. Even though it is possible to obtain generator matrices from parity check matrices using Gaussian elimination, the resulting matrix is no longer sparse and storing a large generator matrix can be complex.

Encoder 203 generates signals from alphabet Y to a modulator 205 using a simple encoding technique that makes use of only the parity check matrix by imposing structure onto the parity check matrix. Specifically, a restriction is placed on the parity check matrix by constraining certain portion of the matrix to be triangular. Such a restriction results in negligible performance loss, and therefore, constitutes an attractive trade-off. The construction of such a parity check matrix is described more fully described in a co-pending patent application filed Jul. 3, 2003, and entitled, "Method and System for Providing Low Density Parity Check (LDPC) Encoding"; Ser. No. 10/613,823); the entirety of which is incorporated herein by reference.

Modulator 205 maps the encoded messages from encoder 203 to signal waveforms that are transmitted to a transmit antenna 207, which emits these waveforms over the communication channel 103. Accordingly, the encoded messages are modulated and distributed to a transmit antenna 207. The transmissions from the transmit antenna 207 propagate to a digital modem, as discussed below. In the case of a satellite communication system, the transmitted signals from the antenna 207 are relayed via a satellite.

Figure 3:
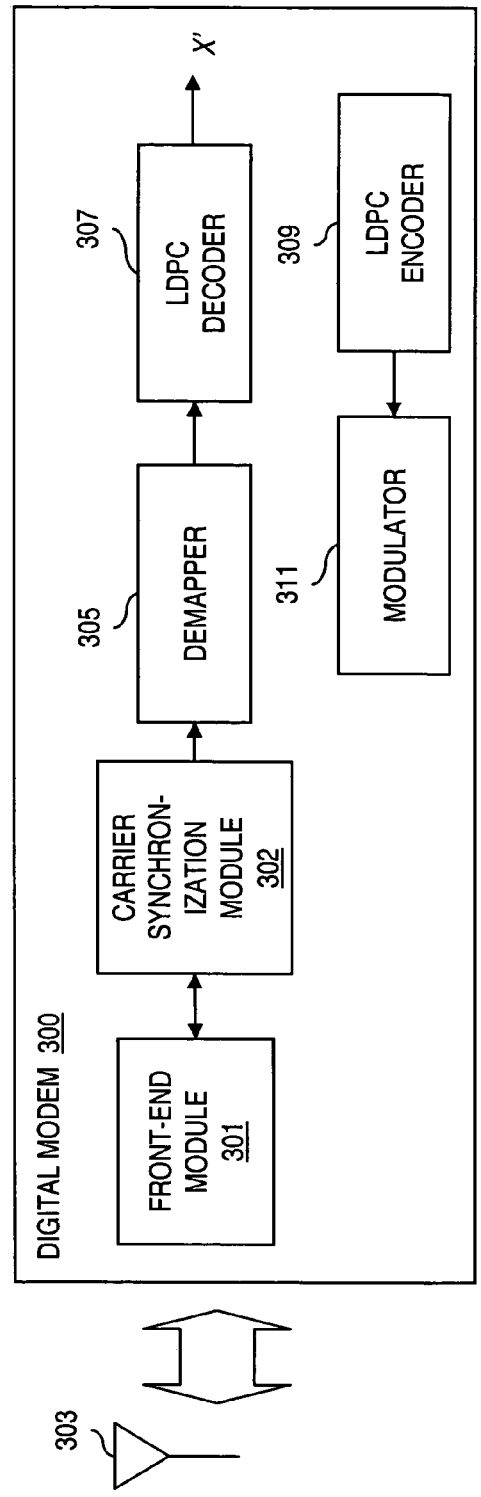
FIG. 3 is a diagram of an exemplary digital modem in the system of FIG. 1.

FIG. 3 is a diagram of an exemplary digital modem in the system of FIG. 1. The digital modem 300, as a modulator/demodulator, supports both transmission and reception of signals from the transmitter 200. According to one embodiment of the present invention, the modem 300 has a front-end module 301 that provides filtering and symbol timing synchronization of the LDPC encoded signals received from antenna 303, a carrier synchronization module 302 that provides frequency and phase acquisition and tracking of the signals output from the front-end module 302. A demapper 305 performs demapping of received signals output from the carrier synchronization module 302. After demodulation, the signals are forwarded to a LDPC decoder 307, which attempts to reconstruct the original source messages by generating messages, X'.

On the transmission side, the modem 300 utilizes a LDPC encoder 309 to encode input signals. The encoded signals are then modulated by a modulator 311, which can employ a variety of modulation schemes—e.g., BPSK (Binary Phase Shift Keying), QPSK, 8PSK, 16 APSK (Amplitude Phase Shift Keying), or other higher order modulation.

Figure 4A:
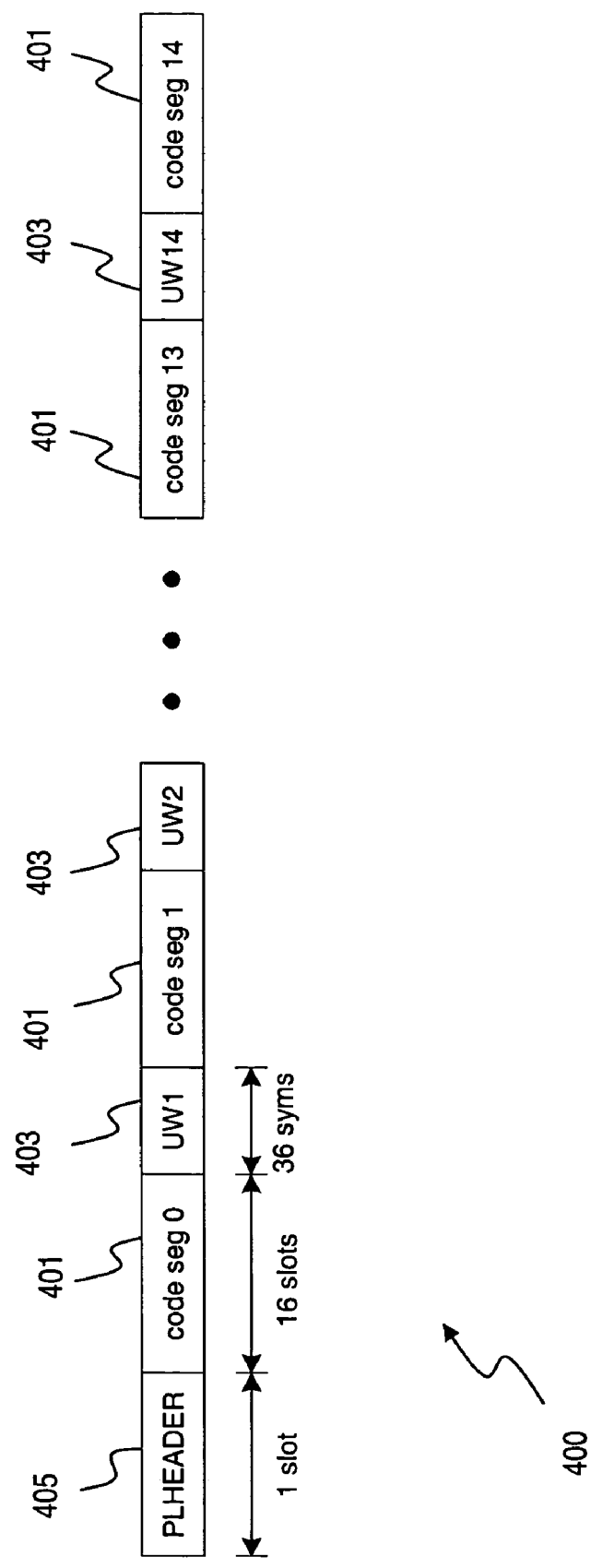
FIGS. 4A and 4B are, respectively, a diagram of an exemplary frame structure used in the system of FIG. 1, and a flowchart of a process for inserting pilot blocks in the frame structure, in accordance with an embodiment of the present invention.

FIG. 4A shows a diagram of an exemplary frame structure, in accordance with an embodiment of the present invention. By way of example, an LDPC coded frame 400, which can support, for example, satellite broadcasting and interactive services, is shown. Under this scenario, the frame structure divides one LDPC frame 400 (e.g., for 8PSK modulation) into 15 code segments 401 (e.g., 16 slots each, and each slot occupies 90 symbols) and inserts 14 unique words (UWs) 403 between two segments 401. The insertion process of the UWs is explained below with respect to FIG. 4B. Each UW 403, in an exemplary embodiment, has 36 symbols (PSK). A preamble 405 serves as a Physical Layer Header (denoted "PLHEADER") and occupies one slot. In this frame structure, the preamble 405 and the UW 403 serve as training blocks; the UWs 403 are optionally inserted as pilot blocks. Although the frame 400 is described with respect to a structure that supports satellite broadcasting and interactive services (and compliant with the Digital Video Broadcast (DVB)—S2 standard), it is recognized that the carrier synchronization techniques of the present invention can be applied to other frame structures.

Figure 4B:
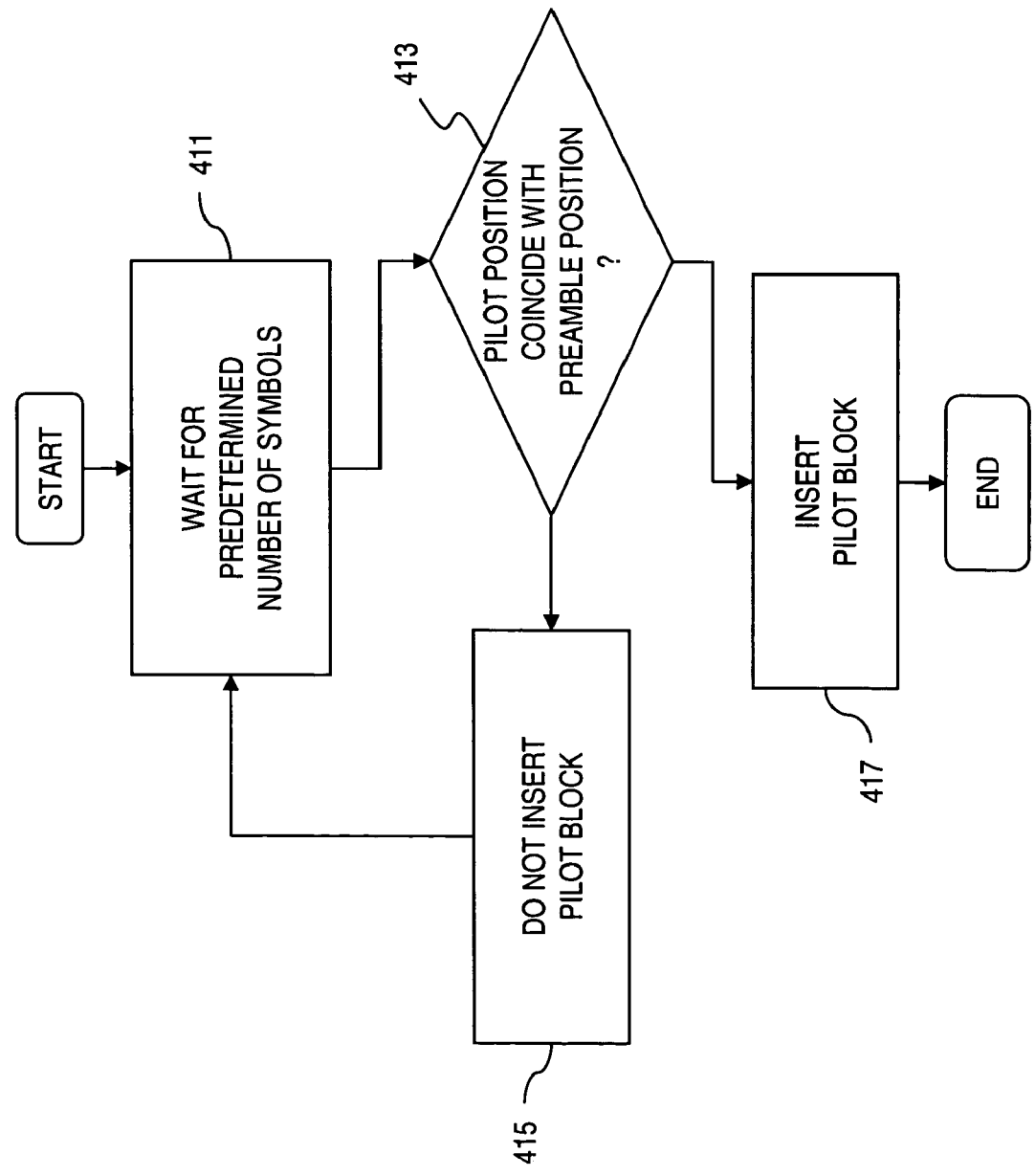

FIG. 4B shows a flowchart of a process for inserting a pilot block in the frame structure of FIG. 4A. This training pilot structure for carrier phase tracking can be implemented in a digital broadcasting and interactive system to combat severe phase noise. In step 411, the pilot insertion process waits for a predetermined number of symbols (i.e., insertion point). Next, it is determined whether the pilot position coincides with the position of the preamble, as in step 413. If the position is designated for the preamble, then the pilot block is not inserted (step 415); otherwise, the pilot block is inserted, per step 417.

For example, in the frame structure of FIG. 4A, the pilot insertion process inserts pilot blocks every 1440 symbols. Under this scenario, the pilot block includes 36 pilot symbols. For instance, in the physical layer frame 400, the first pilot block is thus inserted 1440 symbols after the PLHEADER, the second pilot block is inserted after 2880 symbols, and etc. If the pilot block position coincides with the beginning of the next PLHEADER, then the pilot block is not inserted.

The carrier synchronization module 302 (FIG. 3), according to an embodiment of the present invention, utilizes the preamble 405 and/or UWs 403 for carrier frequency and phase synchronization. As previously mentioned, conventionally, the FEC coded data, which contains known data symbols (e.g., the preamble 405), are ignored in continuous mode modems. That is, the preamble 405 and/or UWs 403 are used for carrier synchronization, i.e., for assisting with the operation of frequency acquisition and tracking, and phase tracking loop. As such, the preamble 405 and UWs 403 are considered "training" or "pilot" symbols, and constitute, individually or collectively, a training block.

The carrier frequency synchronization process, which is more fully described below in FIGS. 5 and 6, adopts a feed-forward frequency estimator for both frequency acquisition and tracking. In an exemplary embodiment, the estimator operates only on the training block, therefore it is independent of modulation scheme.

Figure 5A:
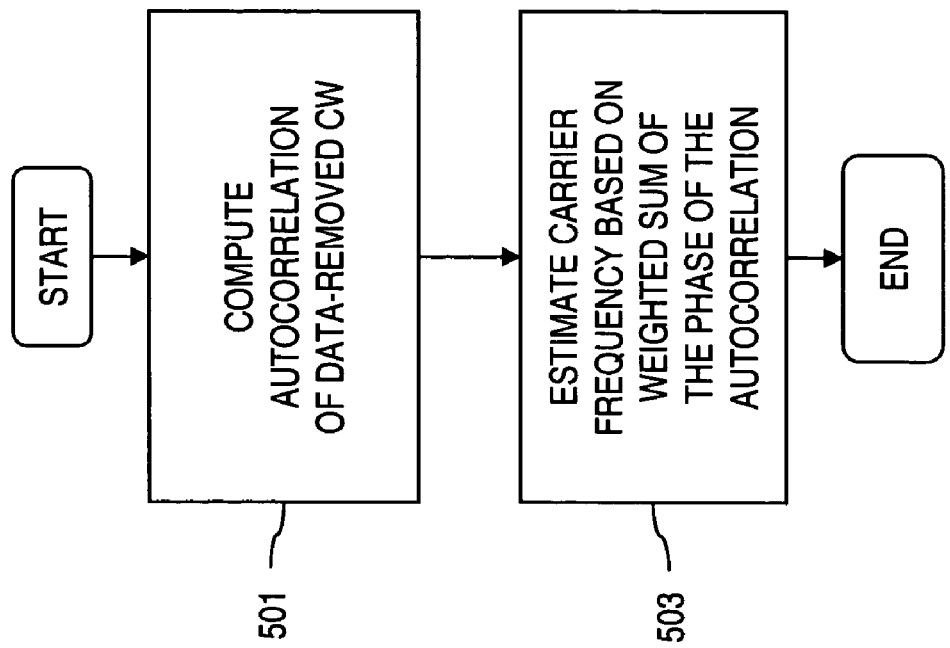
FIGS. 5A and 5B are flowcharts of a frequency acquisition process, in accordance with an embodiment of the present invention.
Figure 5B:
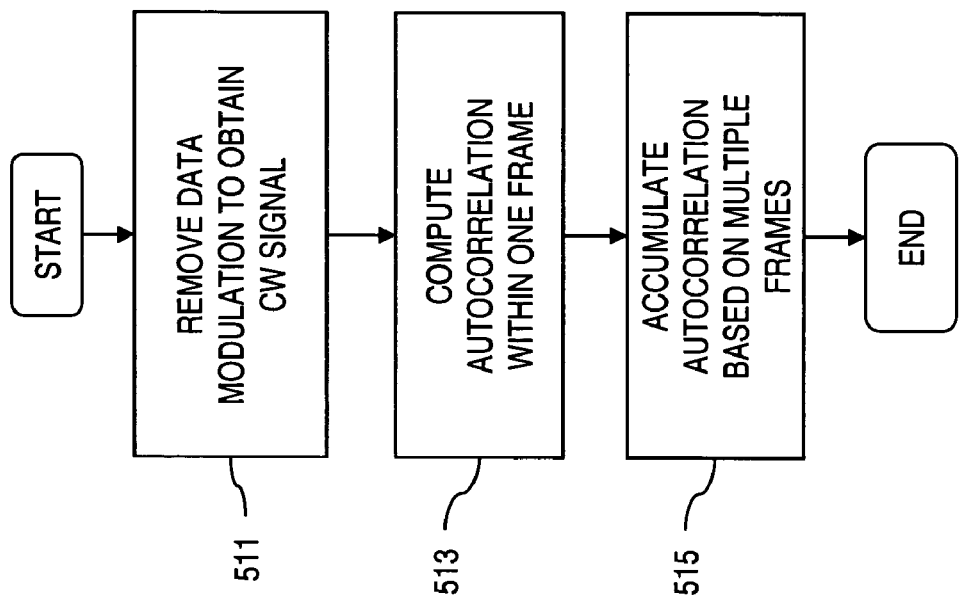

FIGS. 5A and 5B are flowcharts of a frequency acquisition process, in accordance with an embodiment of the present invention. In this example, a frequency acquisition process is executed by the carrier synchronization module 302, whereby different modulation schemes (e.g., BPSK, QPSK, 8PSK, 16APSK, etc.) can be employed. This frequency acquisition process basically includes two steps. First, the autocorrelation of the data-removed continuous wave (CW) is determined, per step 501. Next, the carrier frequency is estimated, as in step 503, based on a weighted sum of the phase of the autocorrelation.

The computation of the autocorrelation, as in step 501, is more fully described in FIG. 5B. In step 511, data modulation is removed based on the known training patterns to obtain the CW signal. Thereafter, the autocorrelation is computed within one LDPC frame, per step 513, as follows:

$$R_f(m) = \sum_{s=0}^{14} \sum_{k=0}^{n-1} (x^f_{s,k+m} p^{f\ *}_{s,k+m})(x^f_{s,k} p^{f\ *}_{s,k})^*, m = 1, \ldots, L,$$

where f is the frame index, s is the UW index, k is the symbol index, $p_s$ is the known training symbols, and LDPC and 8PSK frame format is assumed.

In step 515, the autocorrelation is accumulated based on several LDPC frames, as follows:

$$R(m) = \sum_{f=0}^{N-1} R_f(m).$$

The final frequency estimation is based on the following formula:

$$\Delta \hat{f} = \frac{1}{2\pi T_s} \sum_{m=0}^{L-1} w_m \Delta(m)$$

$$w_m = \frac{3[(2L+1)^2 - (2m+1)^2]}{[(2L+1)^2 - 1](2L+1)}, m = 0, \ldots, L-1$$

where $T_s$ is the symbol period, and $$\Delta(m) = \begin{cases} \arg[R(1)], & m = 0 \\ \mathrm{mod}[\arg(R(m+1)) - \arg(R(m)), 2\pi], & m = 1, \ldots, L-1 \end{cases}.$$

The above frequency acquisition process exhibits excellent performance. Only a small number of autocorrelation (L) are computed over a few LDPC frames (N) can achieve good performance, for example, when L=16, N=5, Es/No=6.7 dB, the RMS (Root Mean Square) frequency error is $8.9 \times 10^{-5}$. The acquisition time is independent of the carrier frequency offset, and is only determined by the desired estimation accuracy. For example, if the desired residue frequency is $3 \times 10^{-4}$, only five LDPC frames are needed to acquire the frequency offset with a 99.999% successful rate. Also, the frequency estimation process has a large frequency acquisition range (larger than 20% symbol rate), a very small estimation variance, and works well at low SNR (even at 0 dB). The approach also is robust to thermal noise and phase noise. Further, the above approach advantageously provides ease of implementation as digital logic, for example, in a VLSI (Very Large Scale Integration) chip.

After the carrier frequency acquisition stage is performed, the frequency tracking process is initiated, as next discussed.

Figure 6:
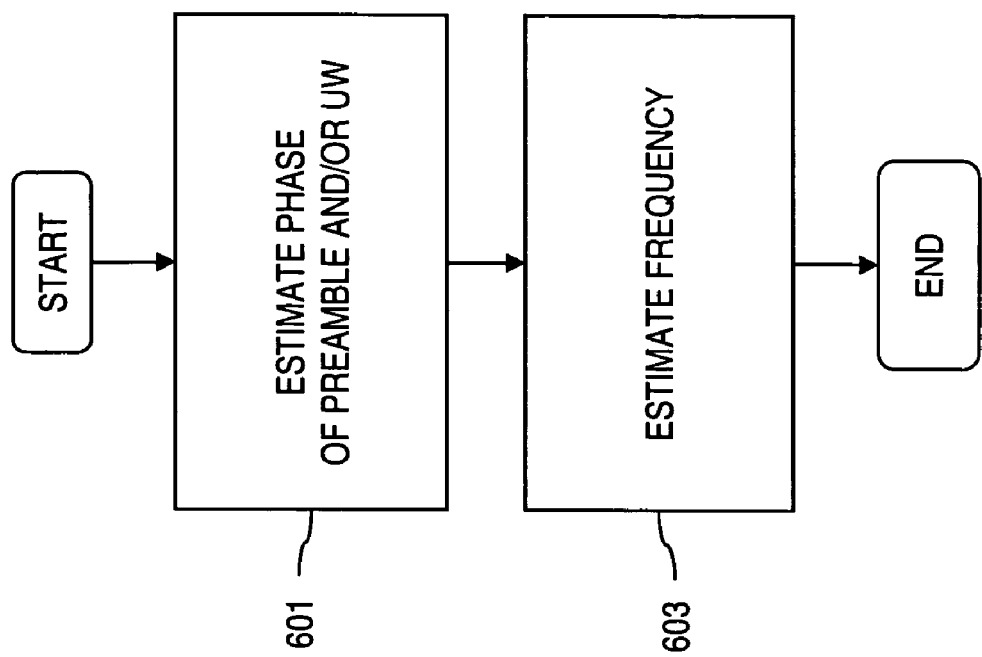
FIG. 6 is a flowchart of a frequency tracking process, according to an embodiment of the present invention.

FIG. 6 is a flowchart of a frequency tracking process, according to an embodiment of the present invention. As noted earlier, the frequency tracking process has a feed-forward structure. By way of example, the operation of the frequency tracking is explained with respect to the scenarios that need additional pilot blocks, e.g., 8PSK modulation at low SNR. In step 601, the phase is estimated from the preamble and UW's using the following formula:

$$\phi_n = \arg\left[\sum_{k=0}^{N_u - 1} x_k p_k^*\right],$$

where $x_k$ is the received symbol, $p_k$ is the known UW pattern, $N_u$ is the length of the UW.

In step 603, the frequency is estimated as follows:

$$\Delta \hat{f} = \frac{1}{2\pi(N_s + N_u)T_s} \sum_{m=0}^{M-1} w_m \mathrm{mod}[\phi_{m+1} - \phi_m, 2\pi]$$

$$w_m = \frac{3[(2M+1)^2 - (2m+1)^2]}{[(2M+1)^2 - 1](2M+1)}, m = 0, \ldots, M-1, M = 14$$

where $N_s$ is the length of code segments, i.e., 16 slots, 1440 symbols, and $N_u$ is the length of the unique word and is equal to 36, and M is the number of UW's in one LPDC frame, e.g., 14 for 8PSK modulation.

Accordingly to one embodiment of the present invention, the frequency tracking process estimates and updates the carrier frequency once per LDPC frame based on the phase estimates from the preamble and UW.

The above frequency tracking scheme provides a number of advantages. Because the process is feed-forward, stability is not a concern. Also, the process can accommodate a large frequency ramp (e.g., 30 KHz) because the carrier frequency is estimated once per LDPC frame. Additionally, the process is robust to thermal noise and phase noise. For example, it has been determined that the RMS frequency error is 6.5× $10^{-7}$ with AWGN (Additive White Gaussian Noise) only, and 6.2×$10^{-6}$ with AWGN plus phase noise at 6.7 dB. At 0 dB, the RMS is 1.3×$10^{-6}$ (AWGN only) and 6.3×$10^{-6}$ (AWGN plus phase noise), i.e., the phase noise is the dominant source of the estimation error.

Figure 7:
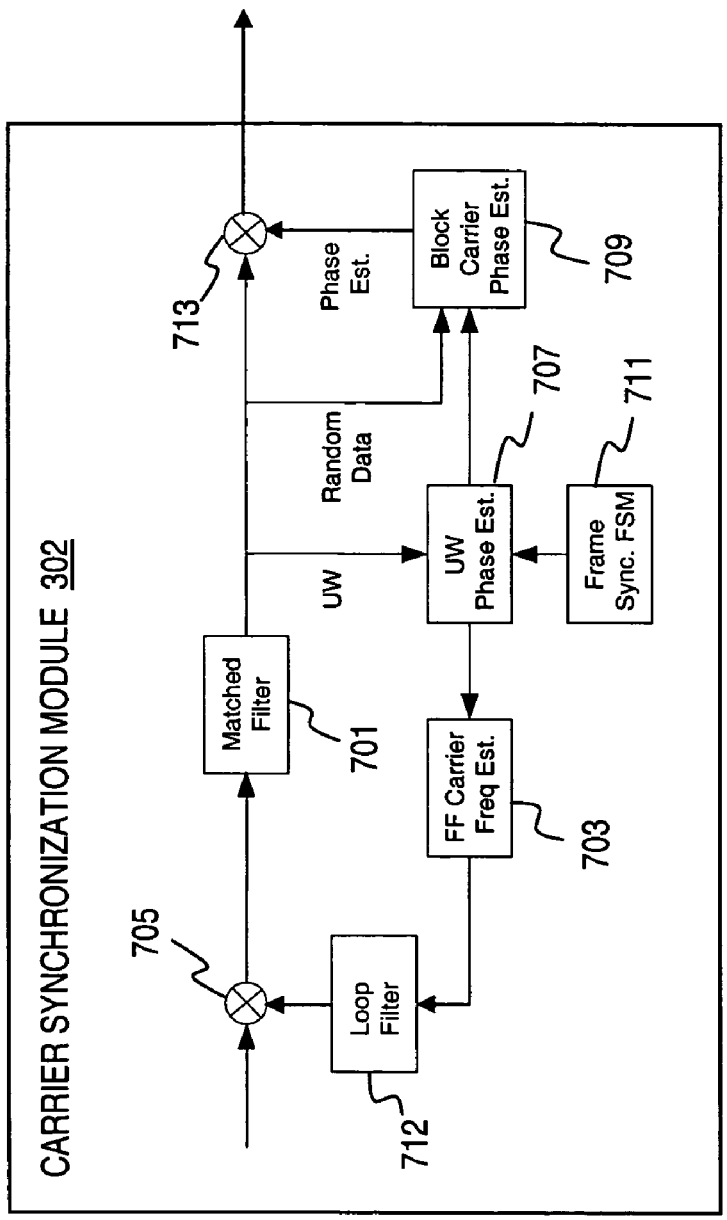
FIG. 7 is a diagram of a carrier synchronization module operating with additional pilot blocks for 8 Phase Shift Keying (PSK) modulation at low Signal-to-Noise Ratio (SNR), according to an embodiment of the present invention.

FIG. 7 shows a diagram of a carrier synchronization module operating in the tracking mode with additional pilot blocks aiding carrier synchronization for 8PSK modulation at low SNR, according to an embodiment of the present invention. A received signal is received and forwarded to a matched filter 701. A feed-forward (FF) frequency estimator 703 obtains a new frequency estimate once per LDPC frame and feeds the estimate to a loop filter 712 and then to a wideband mixer 705 to correct the frequency offset. The match filter 701 outputs the UW to a UW phase estimator 707 and the random data extracted from the received signal to a block carrier phase estimator 709, which generates phase estimates of a code segment to a mixer 713 based on the random data and the phase estimates associated with the UW's. The UW phase estimator 707 outputs the UW phase estimates to the FF carrier frequency estimator 703, per the input from the frame synchronization FSM (Finite State Machine) 711 that determines where the UW's are located. The matched filter 701 also provides the received signal to the mixer 713, which in turn outputs the resultant signal to the demapper 305.

The block carrier phase estimator 709 employs a carrier phase tracking process (in the exemplary scenario of 8PSK modulation) that is based on a Two-Sweep Phase Locked Loop (PLL) architecture with a Maximum Likelihood (ML) phase detector suitable for low SNR use. Unlike conventional PLL, the Two-Sweep PLL has a number of distinctions. The Two-Sweep PLL tracks carrier phase on a segment by segment basis. The phase tracking operations between two segments are independent. The Two-Sweep PLL uses the phase estimates from the UW in the beginning and end of the segment to initialize the phase and frequency components in the PLL and also as phase reference to determine if a cycle slip has occurred. Cycle slips in a PLL system are mainly caused by instantaneous frequency that is out of the tracking range of the loop.

Because a traditional PLL is a causal system, such a system estimates carrier phase based on past samples. By contrast, the Two-Sweep PLL, according to an embodiment of the present invention, estimates carrier phase based on both the past and future samples by sweeping the segment of data from both the forward and reverse directions, as illustrated in FIG. 8.

Figure 8:
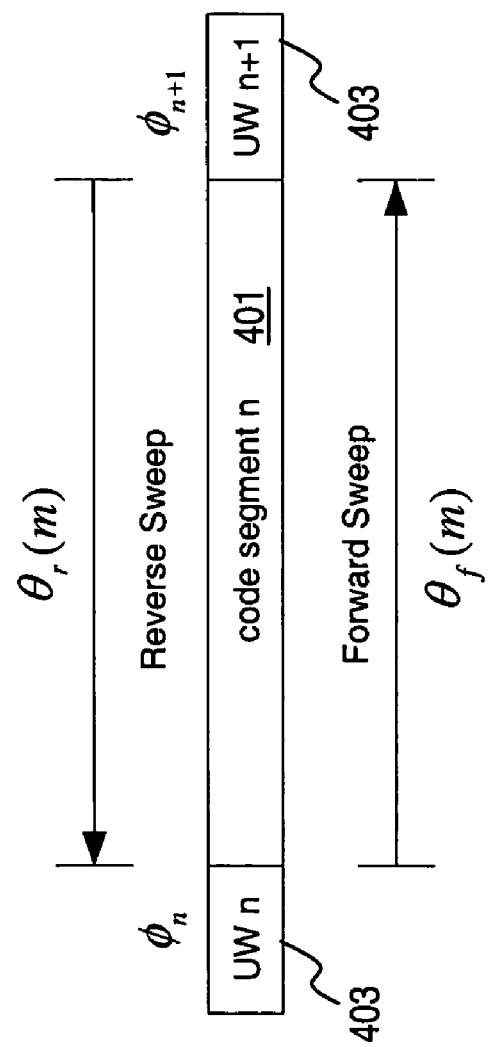
FIG. 8 is a diagram of a Two-Sweep Phase Locked Loop (PLL) process operating on the frame structure of FIG. 4A, according to an embodiment of the present invention.

FIG. 8 shows a diagram of a Two-Sweep Phase Locked Loop (PLL) process operating on a frame structure, according to an embodiment of the present invention. In order to suppress cycle slips, the Two-Sweep PLL estimates the instantaneous frequency within the segment before phase sweeping, and intelligently combines the phase estimates from both the forward and reverse directions as the final phase estimate.

Figure 9:
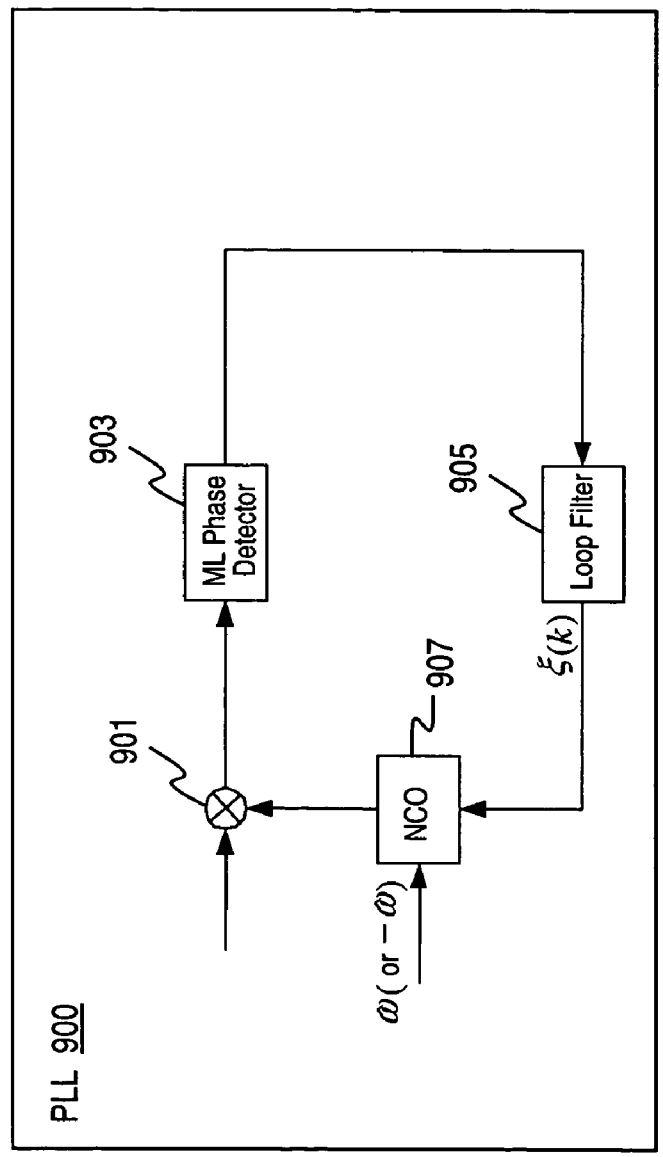
FIG. 9 is a diagram of a PLL utilized in a Two-Sweep PLL, according to an embodiment of the present invention.

FIG. 9 shows a diagram of a PLL used in the Two-Sweep PLL, which executes the phase sweeping in one direction, according to an embodiment of the present invention. The Two-sweeping PLL can utilize two of such PLLs 900 in parallel operation, or alternatively, a single PLL 900 running sequentially in a serial implementation. An input mixer 901 corrects the phase offset of the input signal with the phase estimate from the tracking loop. An ML phase detector 903 estimates the residue phase error of the rotated signal, and then passes it through a loop filter 905 (which is more fully described in FIG. 11). The loop filter 905 removes noise and tracks frequency of the signal, and then closes the phase lock loop by sending the phase estimate to a numerically controlled oscillator (NCO) 907, which projects the phase estimate to the in-phase and quadrature axes.

The ML phase detector 903 used in the Two-Sweep PLL is derived from maximum likelihood (ML) rule, and is suitable for low SNR. The phase detector estimates phase $\hat{\theta}_k$ on each received symbol $x_k$ as follows:

$$\hat{\theta}_k = Im(x_k \hat{d}_k^*),$$

where $\hat{d}_k$ is the soft estimate of the transmitted data symbol $d_k$, i.e., $$\hat{d}_k = \frac{\sum_{m=0}^{M-1} e^{-\frac{\|x_k - c_m\|^2}{2\sigma^2}} c_m}{\sum_{m=0}^{M-1} e^{-\frac{\|x_k - c_m\|^2}{2\sigma^2}}},$$

M: the dimension of modulation, e.g., 4 for QPSK, 8 for 8PSK; $c_m = e^{j(2\pi m/M + \pi/M)}$: constellation point; $\sigma^2$: AWGN variance; and the character * is the complex conjugate operation.

The SNR of the phase detector can defined as:

$$SNR_{PD} = \frac{A^2}{\sigma_p^2},$$

where A is the gain of the phase detector, $\sigma_p^2$ is the estimation variance. The SNR of the ML phase detector for 8PSK modulation is −4.5 dB at 6.6 dB, which is 3.5 dB better over traditional decision-directed phase detector.

Figure 10:
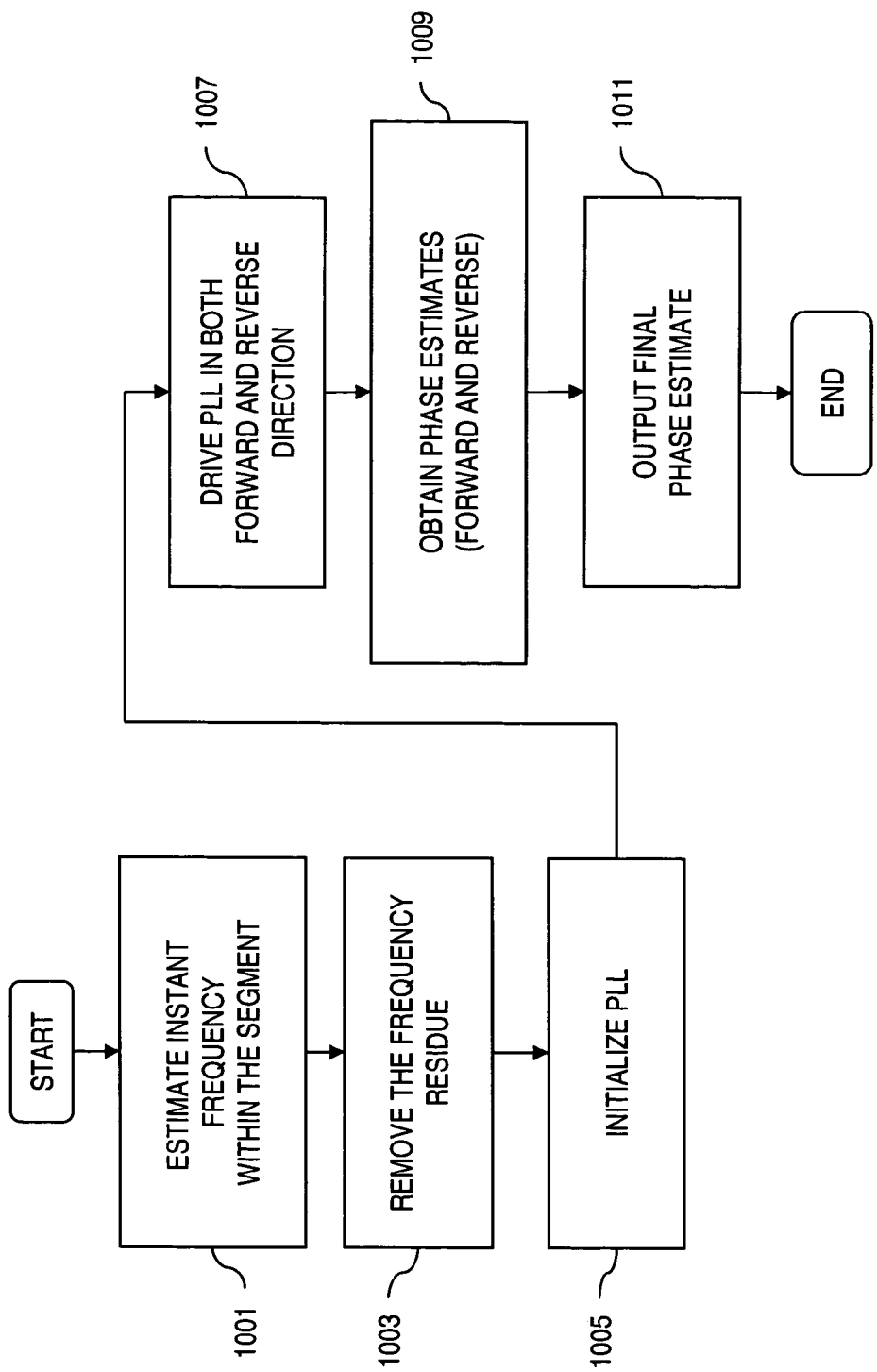
FIG. 10 is a flowchart of a Two-Sweep Phase Locked Loop (PLL) process, according to an embodiment of the present invention.

FIG. 10 shows a flowchart of a Two-Sweep Phase Locked Loop (PLL) process, according to an embodiment of the present invention. The Two-Sweep PLL's operation within one code segment can be divided into three stages: (1) Initialization, (2) Two Sweeping, and (3) Phase Combining. During initialization, the phase estimates are obtained from the pilot blocks, i.e., preamble and/or UW, at the beginning and end of the current code segment using the following formula:

$$\phi_n = \arg\left[\sum_{k=0}^{N_u-1} x_k p_k^*\right],$$

where $x_k$ is the received symbol, $p_k$ is the known pilot pattern, $N_u$ is the length of the pilot blocks (36 for UWs, 90 for the preamble).

The instantaneous frequency within a code segment is estimated based on the unwrapped phase estimates from UWs enables suppression of cycle slips. This estimate, as in step 1001, is determined as follows:

$$\hat{\omega} = \frac{\phi_{n+1} - \phi_n}{N_s + N_u},$$

where $\phi_{n+1}$ and $\phi_n$ are the phase estimates from the UWs at the beginning and the end respectively, and $N_s$ is the length of the code segment, e.g., 1440.

The phase unwrap operation is given by:

$$\phi_{n+1} = \phi_{n+1} + 2\pi \times \text{floor}\left(\frac{\phi_n - \phi_{n+1} + \pi}{2\pi}\right),$$

where floor(x) rounds x to the nearest integer towards minus infinity.

The Two Sweeping phase begins with step 1003, wherein the instantaneous frequency offset $\hat{\omega}$ is removed before PLL sweeping by multiplying the received symbol $x_k$ with $\exp(-j\hat{\omega}k)$, i.e., $$x_k \exp(-j\hat{\omega}k), k=0, \ldots, N_s-1$$

which results in a new $x_k$. In an exemplary embodiment, the register in the NCO 907 is programmed with $\hat{\omega}$.

Figure 11:
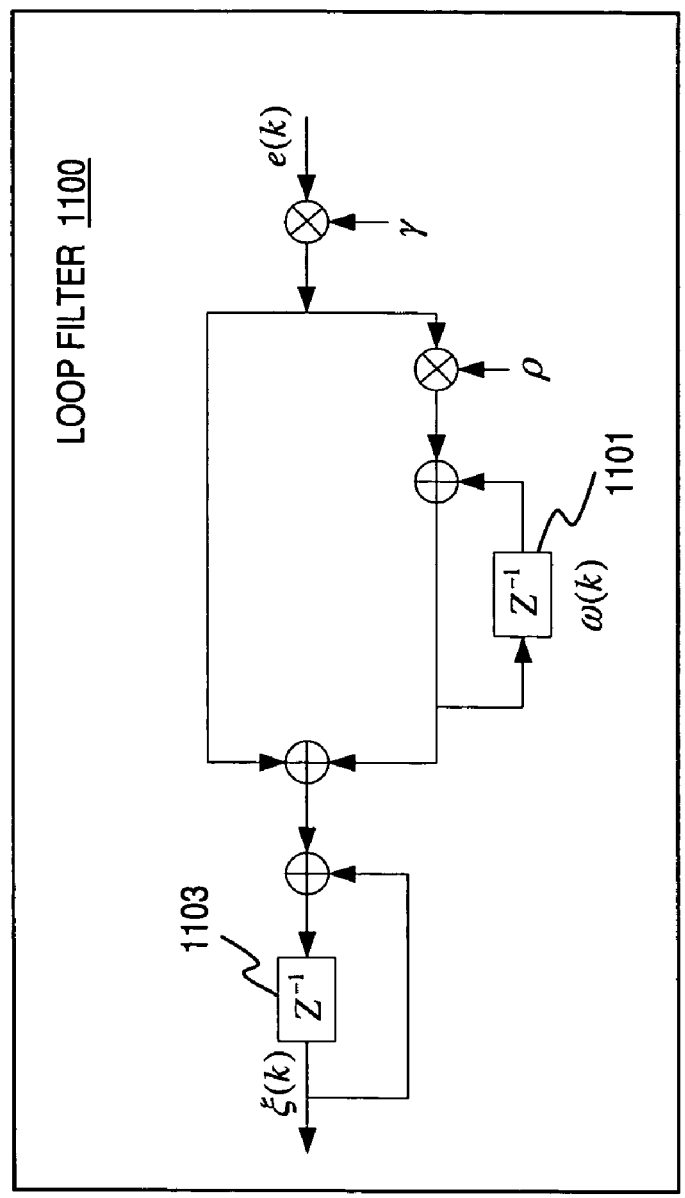
FIG. 11 is a diagram of a loop filter utilized in the Two-Sweep Phase Locked Loop (PLL) process of FIG. 10.

FIG. 11 shows a diagram of a loop filter utilized in the Two-Sweep Phase Locked Loop (PLL) process of FIG. 10. As shown in FIG. 11, a loop filter 1100 can be used, whereby the loop frequency register ω(k) is initialized with 0 in forward-sweep PLL (step 1005); in the reverse sweep PLL, the loop frequency register ω(k) 1101 is also initialize with 0. The phase register ξ(k) 1103 is initialized with the phase estimate $\phi_n$ from the UW at the beginning in the forward PLL. The whole code segment is swept, as in step 1007, from the beginning to the end, obtaining the phase estimate $\theta_f(m)$, m=0, ..., $N_s$-1 (step 1009).

The phase register ξ(k) 1103 is initialized with the phase estimate $\phi_{n+1} - \omega \times (N_s - 1)$ from the UW at the end in the reverse PLL. The whole code segment is then swept from the end to the beginning, obtaining the phase estimate $\theta_r(m)$, m=0, ..., $N_s$-1.

According to an embodiment of the present invention, the forward and reverse sweeps are performed simultaneously, thereby enhancing speed. In other words, one or more PLLs can be utilized. In the case of a single PLL, the forward and reverse sweeps are performed sequentially.

The final phase estimate (as seen in FIG. 10) is the combination of the phase estimates from both the forward and reverse PLL sweeps and the instantaneous frequency estimate (per step 1011).

The impact of cycle slips can be further reduced by the following alternative process. Before phase combining, the process tests whether there are any substantial phase errors at the end of both sweeps as follows. A phase error is defined, $\epsilon_f = \theta_f(N_s-1) + \omega(N_s-1) - \phi_{n+1}$ at the end of the forward sweep, in which the following unwrap technique can be used on $\epsilon_f$:

$$\epsilon_f = \epsilon_f - 2\pi \times \text{floor}\left(\frac{\epsilon_f + \pi}{2\pi}\right).$$

Also, phase error $\epsilon_e = \theta_r(0) - \phi_n$ is defined at the end of the reverse sweep, in which the same unwrap technique is used on $\epsilon_e$.

If either $|\epsilon_f| < t_e$ or $|\epsilon_e| < t_e$, where $t_e$ is a predetermined threshold, e.g., $t_e = \pi/M$ ($\pi/8$ for 8PSK), then the sweep is denoted "in synchronization", and the final phase estimate $\hat{\theta}(m)$ is given by $$\hat{\theta}(m) = \left(\theta_f(m) + \theta_r(m) + 2\pi \times \text{floor}\left(\frac{\theta_f(m) - \theta_r(m) + \pi}{2\pi}\right)\right)/2 + \hat{\omega}m,$$

$$m = 0, \ldots, N_s - 1.$$

If both $|\epsilon_f| > t_e$ and $|\epsilon_e| > t_e$, it is highly probable that there is a substantial frequency change within the segment, the following steps are performed to handle such a special case. First, $m_c$ is estimated (where such a substantial frequency change occurs) as follows:

$$m_c = \frac{|\epsilon_r|(N_s - 1)}{|\epsilon_f| + |\epsilon_r|}.$$

Next, the forward PLL sweep is initialized from $m_c$ with $\xi(m_c) = \theta_f(m_c)$ and $$\omega(m_c) = \frac{-\epsilon_f}{N_s - m_c},$$

and a forward PLL sweep is performed from $m_c$ to $N_s-1$, thereby obtaining a new $\theta_f(m)$ for that portion. The reverse PL sweep is also initialized from $m_c$ with $\xi(m_c) = \theta_r(m_c)$ and $$\omega(m_c) = \frac{-\epsilon_r}{m_c + 1},$$

in which a forward PLL sweep is performed from $m_c$ to 0. A new $\theta_r(m)$ is obtained for that portion.

The final phase estimate $\hat{\theta}(m)$ is given by $$\hat{\theta}(m) = \left(\theta_f(m) + \theta_r(m) + 2\pi \times \text{floor}\left(\frac{\theta_f(m) - \theta_r(m) + \pi}{2\pi}\right)\right)/2 + \hat{\omega}m,$$

$$m = 0, \ldots, N_s - 1.$$

Under the above Two-Sweep PLL arrangement, the phase estimate is based on both the past and future samples. The phase estimates from both the forward and reverse sweeps are correlated, however the noise incurred during the processes is not. Therefore, the process can reduce phase error variance by half (i.e., 3 dB).

This process also yields good phase tracking results. The RMS phase error for 8PSK modulation with DVB-S phase noise mask is 3.2 degree (at 6.6 dB) compared with the RMS phase error of 4.5 degree obtained by the traditional forward sweeping PLL. The segment-by-segment phase tracking, instantaneous frequency estimation and removal, and two-sweep phase estimation plus intelligent phase combing efficiently suppress cycle slips from occurring.

Further, the loop can start phase tracking immediately after the whole code segment is received (16 slots). Also, the PLL requires only a small storage capacity to buffer, according to an exemplary embodiment, 16 slot I and Q samples, and 1440 phase samples (half each assigned to one sweep). The PLL is robust to frequency residue error (up to $3\times10^{-4}$) due to the instantaneous frequency estimation. For phase tracking of high order modulation, such as 8PSK, large frequency offset is very harmful.

Figure 12:
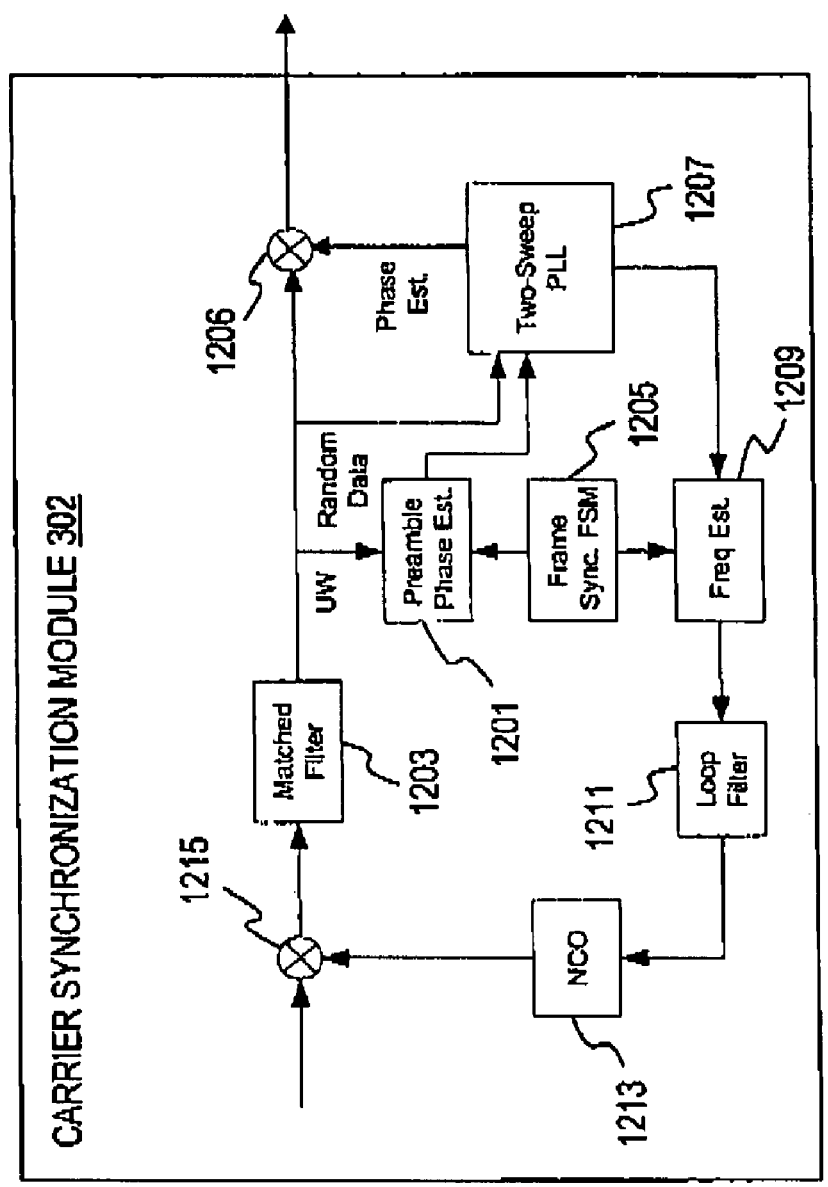
FIG. 12 is a diagram of a carrier synchronization module operating without additional pilot blocks for QPSK (Quadrature Phase Shift Keying) modulation, according to an embodiment of the present invention.

FIG. 12 is a diagram of a carrier synchronization module operating without additional pilot blocks aiding carrier synchronization for QPSK (Quadrature Phase Shift Keying) modulation, according to an embodiment of the present invention. The carrier synchronization process for the pilotless mode is similar to that used in pilot mode, as explained with respect to FIG. 7. The carrier synchronization module 302 operates by utilizing only the one-slot preamble for training; that is, the UWs are not used. The frequency acquisition in the pilotless mode is a two-step process that includes coarse frequency estimation by a feed-forward frequency estimator and then fine frequency estimation by a Two-Sweep PLL operating in acquisition mode.

The carrier synchronization module 302 provides phase recovery in the tracking mode based on the Two-Sweep PLL. A Preamble Phase Estimator 1201 receives the preamble that is output from a Matched Filter 1203. The Preamble Phase Estimator 1201 outputs the phase estimate of preambles based on the Frame Sync FSM (Finite State Machine) 1105 that decides where a new preamble is located and supplies it to a Two-Sweep PLL 1207 (similar to the one used in the pilot mode). The Two-Sweep PLL 1207 also receives as input the random data extracted from the received signal. The phase estimate generated by the Two-Sweep PLL 1207 is fed to a Frequency Estimator 1209; ultimately, the phase estimate generated by the Two-Sweep PLL 1207 is provided to the mixer 1206 that rotates the signal from the Matched Filter 1203 based on the phase estimate to the demapper 305. The Frequency Estimator 1209 outputs frequency estimate to a Loop Filter 1211 (for example, as the one shown in FIG. 11), which tracks the frequency offset and supplies the resultant signal to a Numerically Controlled Oscillator (NCO) 1213. The NCO 1213 rotates the received signal according to the frequency estimate from the Loop Filter 1211 to a wideband mixer 1215.

The carrier synchronization module 302 advantageously provides high performance at very low SNR (e.g., 1 dB), while minimizing the use of training symbols. The carrier synchronization module 302 supports fast carrier frequency and phase acquisition (e.g., less than 50 ms).

In one embodiment of the present invention, the carrier frequency acquisition process involves two stages: a coarse frequency estimation process, and a fine tune process. The coarse frequency estimation process resembles that used in 8PSK (FIG. 5). The difference with the pilotless mode is that only the 90-symbol preamble is used in the computation of the autocorrelation. The autocorrelation is computed within one LDPC frame:

$$R_f(m) = \sum_{k=0}^{n-1}\left(x_{k+m}^f p_{k+m}^{f\,*}\right)\left(x_k^f p_k^{f\,*}\right)^*,\ m=1,\ldots,L,$$

where f is the frame index, k is the symbol index, $p_s$ is the known data symbols in the preamble, n is equal to 90. The autocorrelation is then accumulated based on several LDPC frames for determining the final frequency estimation.

Figure 13:
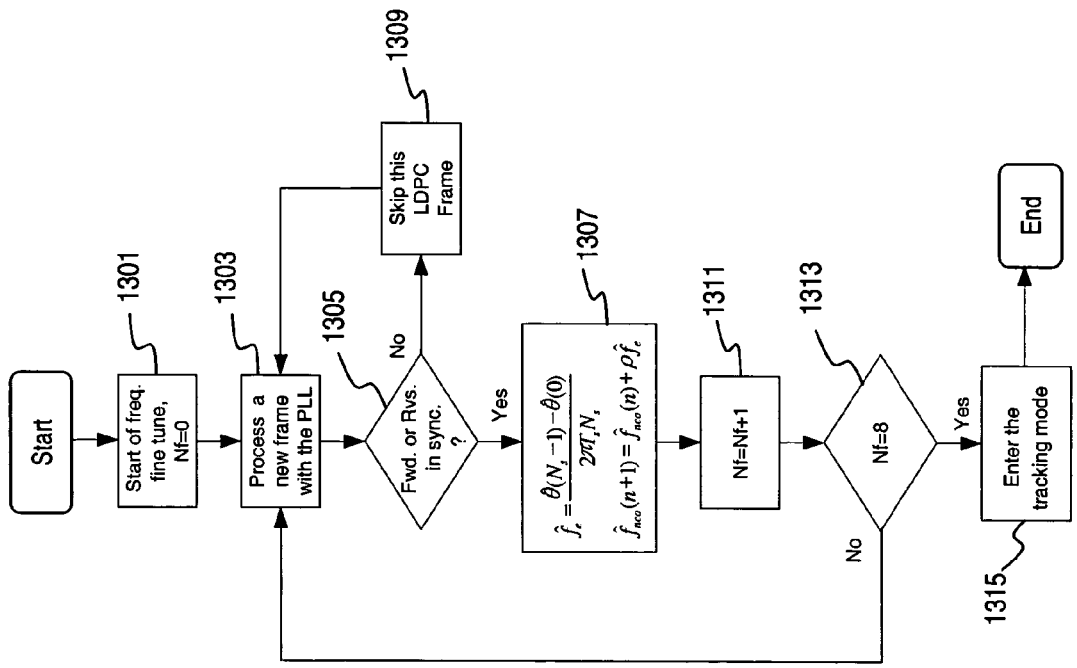
FIG. 13 is a flowchart of a fine-tune sub-process of the frequency acquisition process used in the carrier synchronization module of FIG. 12.

FIG. 13 is a flowchart of a fine-tune sub-process of a frequency acquisition process used in the carrier synchronization module of FIG. 12. After the coarse frequency estimation ends, the frequency acquisition process performed by the carrier synchronization module 302 can enter the fine tune stage. The fine-tune process is based on a frequency tracking loop whose frequency error estimation is performed once per LDPC frame and based on the phase tracking result of the Two-Sweep PLL 1207 operating in an acquisition mode and the phase estimates from the preambles. In such a mode, the PLL has a larger loop bandwidth (e.g., $2\times10^{-3}$) and a smaller damping factor (e.g., 1.1).

The fine-tune process is based on the Two-Sweep PLL 1207 (FIG. 12). The process estimates the frequency error once per LDPC frame and updates the NCO 1213 connected to the wideband mixer 1215. First, $\hat{\theta}(m)$, $m=0,\ldots,N_s-1$ ($N_s$ is the LDPC frame length, e.g., 32400 for QPSK) is defined as the phase tracking result for one LDPC frame.

The start of the fine tune process initializes a frame counter, Nf to 0, per step 1301. In this example, the process iterates 8 times (i.e., Nf=8). In step 1303, a new LDPC frame is processed with the PLL, which is initialized with the phase estimates based on the preambles; the operation of Two-Sweep PLL is explained in more detail below. Next, it is determined whether the forward sweep or the reverse sweep is in synchronization (step 1305). If either the forward sweep or the reverse sweep (or both) is in synchronization, the frequency error estimate, per step 1307, is given by $$\hat{f}_e = \frac{\hat{\theta}(N_s-1)-\hat{\theta}(0)}{2\pi T_s N_s},$$

where $\hat{\theta}(m)$ is the final phase estimate generated by the Two-Sweep PLL 1207, and then the frequency in the NCO is updated by $$f_{nco}(n+1)=f_{nco}(n)+\rho \hat{f}_e,$$

where $\rho$ is the Loop Filter 1211 parameter, e.g., 0.5.

If neither sweep is in synchronization, the LDPC frame is skipped in the fine-tune operation, per step 1309. If a certain number of frequency fine tunes have occurred (as implemented by steps 1311 and 1313), the loop enters the tracking stage, per step 1315, as explained in FIG. 14.

Figure 14:
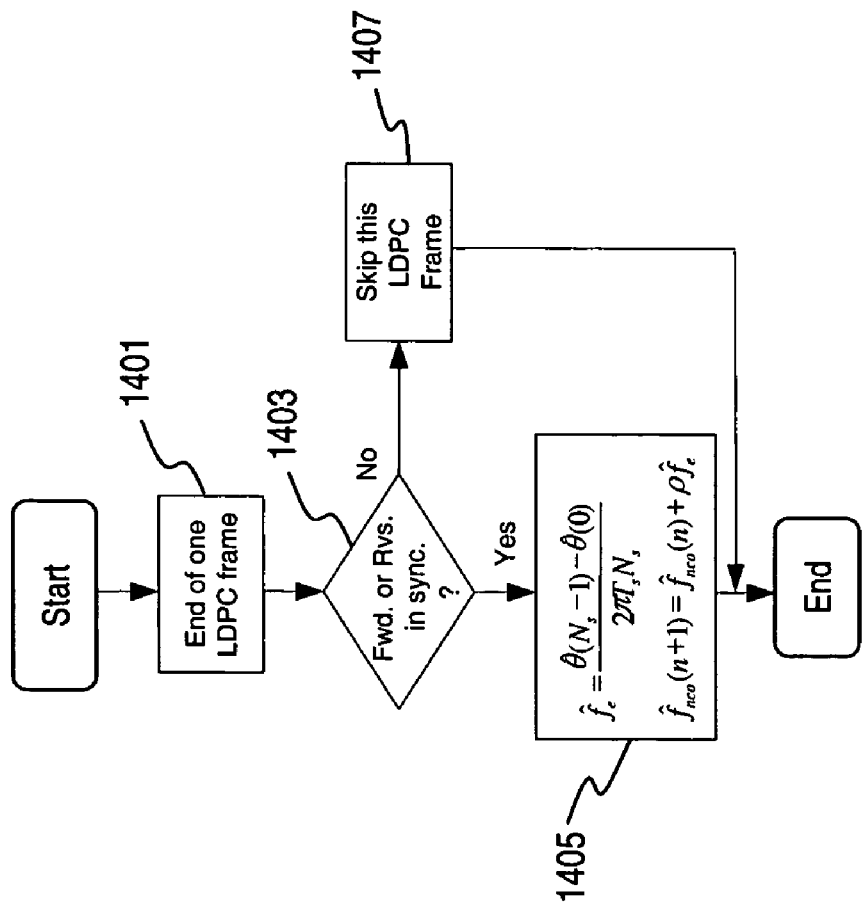
FIG. 14 is a flowchart of a frequency tracking process used in the carrier synchronization module of FIG. 12.

FIG. 14 is a flowchart of a frequency tracking process used in the carrier synchronization module of FIG. 12. The carrier frequency tracking process is similar to the fine tune in the frequency acquisition stage. The tracking process estimates the frequency error once per LDPC frame based on the phase tracking result from the Two-Sweep PLL 1107 and updates the NCO 1213 accordingly; the process performs this only when the PLL 1107 is in synchronization. The only difference between the fine tune process and this frequency tracking process is that the Two-Sweep is operated with a much narrower loop bandwidth (e.g., $5\times10^{-4}$) and larger damping factor (e.g., 2).

At the end of one LDPC frame, the tracking process determines whether the forward sweep or the reverse sweep is in synchronization, per steps 1401 and 1403. If the sweeps are in synchronization, the frequency error estimate is computed, per step 1405, as follows:

$$\hat{f}_e = \frac{\hat{\theta}(N_s - 1) - \hat{\theta}(0)}{2\pi T_s N_s},$$

and the frequency in the NCO 1213 is updated by $$\hat{f}_{nco}(n+1) = \hat{f}_{nco}(n) + \rho \hat{f}_e.$$

If the forward sweep and the reverse sweep are not in synchronization, the LDPC frame is skipped, per step 1407.

Figure 15:
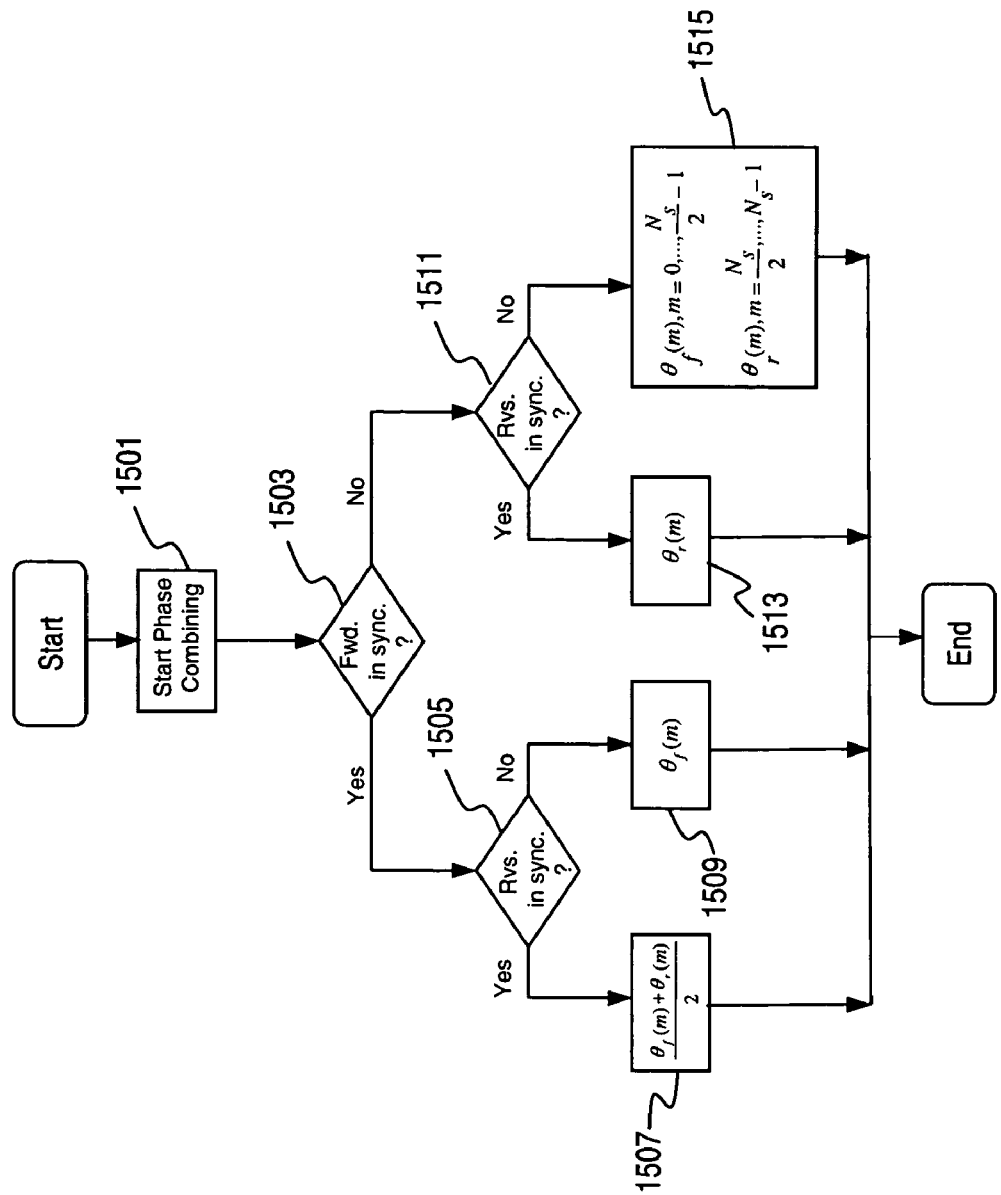
FIG. 15 is a flowchart of the phase combining stage of the Two-Sweep Phase Locked Loop (PLL) process of FIG. 10.

FIG. 15 is a flowchart of the phase combining stage of the Two-Sweep Phase Locked Loop (PLL) process, according to an embodiment of the present invention. The carrier phase tracking process, in the pilotless mode, is based on the Two-Sweep PLL architecture with a ML phase detector that is suitable for low SNR. The process tracks carrier phase on a frame by frame basis. According to one embodiment of the present invention, the phase tracking operations between two LDPC frames are independent. The tracking process uses the phase estimates from the preamble of the current frame and the preamble of the next frame to initialize the phase component in the PLL. These phase estimates also provide a phase reference for determining whether a cycle slip has occurred. The new PLL estimates carrier phase based on both the past and future samples by sweeping the segment of data from both the forward and reverse directions. In order to suppress cycle slips, the new PLL intelligently combines the phase estimates from both the directions as the final phase estimate, as shown in FIG. 14.

The ML phase detector 911 (of FIG. 9) used in the Two-Sweep PLL is derived from a maximum likelihood (ML) rule. The phase detector estimates phase $\hat{\theta}_k$ on each received symbol $x_k$ as follows:

$$\hat{\theta}_k = Im(x_k \hat{d}_k^*),$$

where $\hat{d}_k$ is the soft estimate of the transmitted data symbol $d_k$, i.e., $$\hat{d}_k = \frac{\sum_{m=0}^{M-1} e^{\frac{\|x_k - c_m\|^2}{2\sigma^2}} c_m}{\sum_{m=0}^{M-1} e^{\frac{\|x_k - c_m\|^2}{2\sigma^2}}},$$

M: the dimension of modulation, 4 for QPSK, 8 for 8PSK; $c_m = e^{j(2\pi m/M + \pi/M)}$: constellation point; and $\sigma^2$: AWGN variance; the character * is the complex conjugate operation.

The SNR of phase detector is defined as follows:

$$SNR_{PD} = \frac{A^2}{\sigma_p^2},$$

where A is the gain of the phase detector, $\sigma_p^2$ is the estimation variance. The SNR of the ML phase detector in QPSK modulation is −4.1 dB at 1 dB, which is 1.5 dB better over traditional decision-directed phase detector.

As with the pilot mode operation described with respect to FIG. 10, the operation of the Two-Sweep PLL 1207 within one LDPC frame has three stages. During the Initialization stage, the phase estimates are obtained from the preamble at the beginning and end of the current frame:

$$\phi_n = \arg\left[\sum_{k=0}^{N_u - 1} x_k p_k^*\right],$$

where $x_k$ is the received symbol, $p_k$ is the known preamble pattern, $N_u$ is the length of the preamble (e.g., 90). Because the LDPC frame is relatively long (e.g., 32400), it is difficult to estimate the instantaneous frequency based on the phase estimates from the preambles. However, the PLL for low order modulation like QPSK is more robust to phase noise and frequency error than that in high order modulation like 8PSK.

In the Two Sweeping stage, the phase register ξ(k) 1103 (FIG. 10) is initialized with the phase estimate $\phi_n$ from the preamble at the beginning in the forward PLL. The whole frame is then swept from the beginning to the end, yielding the phase estimate $\theta_f(m)$, m=0, . . . , $N_s$−1. In the reverse PLL, the phase register ξ(k) 1103 is initialized with the phase estimate $\phi_{n+1}$ from the preamble at the end in the reverse PLL, in which the process sweeps the entire frame from the end to the beginning to obtaining the phase estimate $\theta_r(m)$, m=0, . . . , $N_s$−1. The loop frequency register ω(k) is initialized with 0 for both directions. The forward and reverse sweeps can be performed simultaneously.

Thereafter, the phase combining stage is commenced, per step 1501. The final phase estimate is the combination of the phase estimates from both the forward and reverse sweeping. In step 1503, the process determines with the forward sweep is in synchronization; if yes, it is determined whether the reverse sweep is in synchronization, per step 1505. If both the forward and reverse sweeps are in synchronization, the final phase estimate $\hat{\theta}(m)$ is given by $$\hat{\theta}(m) = \left(\theta_f(m) + \theta_r(m) + 2\pi \times \text{floor}\left(\frac{\theta_f(m) - \theta_r(m) + \pi}{2\pi}\right)\right) / 2,$$

$$m = 0, \ldots, N_s - 1.$$

Otherwise, if only the forward sweep is in synchronization, then $\hat{\theta}(m) = \theta_f(m)$, m=0, . . . , $N_s$−1 is computed, as in step 1509. However, if only the reverse sweep (as determined in step 1511) is in synchronization, then $\hat{\theta}(m) = \theta_r(m)$, m=0, . . . , $N_s$−1 (step 1513).

If neither sweep is in synchronization, then, as in step 1515, $$\hat{\theta}(m) = \begin{cases} \theta_f(m), m = 0, \ldots, N_s/2 - 1 \\ \theta_r(m), m = N_s/2, \ldots, N_s - 1 \end{cases}$$

As in the pilot mode, before phase combining, the process tests whether there are any substantial phase errors at the end of both sweeps as follows. A phase error is defined $\epsilon_f = \theta_f$ $(N_s-1)-\phi_{n+1}$ at the end of the forward sweep, wherein the following unwrap technique is used on $\epsilon_f$, i.e., $$\varepsilon_f = \varepsilon_f - 2\pi \times \text{floor}\left(\frac{\varepsilon_f + \pi}{2\pi}\right).$$

If $|\epsilon_f|<t_e$, where $t_e$, is a predetermined threshold, e.g., $t_e=\pi/M$ ($\pi/4$ for QPSK), declare the forward sweep is in synchronization. Also, the following phase error $\epsilon_e=\theta_r(0)-\phi_n$, at the end of the forward sweep is defined. The same unwrap technique can be used on $\epsilon_e$. If $|\epsilon_e|<t_e$, the reverse sweep is deemed to be in synchronization.

The above carrier phase tracking process, whether operating using QPSK or 8PSK modulation, exhibits good performance characteristics, whereby, for example, the Two-Sweep Loop is robust to thermal noise and phase noise. Also, the RMS phase tracking error is low (e.g., merely 3.3 degree for QPSK modulation with DVB-S phase noise mask at 1 dB).

Figure 16:
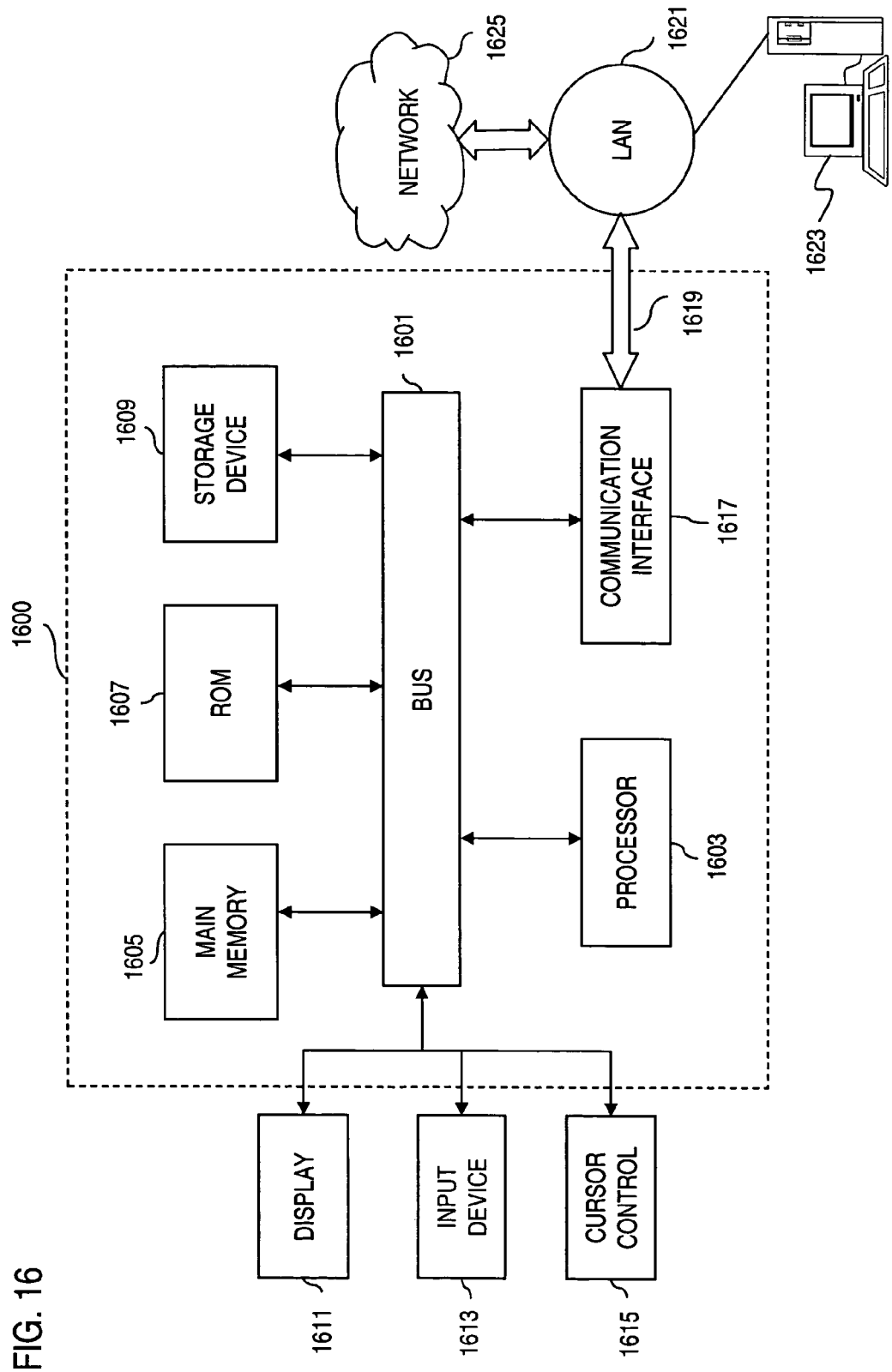
FIG. 16 is a diagram of a computer system that can perform the various processes associated with carrier synchronization, in accordance with embodiments of the present invention.

FIG. 16 illustrates a computer system upon which an embodiment according to the present invention can be implemented. The computer system 1600 includes a bus 1601 or other communication mechanism for communicating information, and a processor 1603 coupled to the bus 1601 for processing information. The computer system 1600 also includes main memory 1605, such as a random access memory (RAM) or other dynamic storage device, coupled to the bus 1601 for storing information and instructions to be executed by the processor 1603. Main memory 1605 can also be used for storing temporary variables or other intermediate information during execution of instructions to be executed by the processor 1603. The computer system 1600 further includes a read only memory (ROM) 1607 or other static storage device coupled to the bus 1601 for storing static information and instructions for the processor 1603. A storage device 1609, such as a magnetic disk or optical disk, is additionally coupled to the bus 1601 for storing information and instructions.

The computer system 1600 may be coupled via the bus 1601 to a display 1611, such as a cathode ray tube (CRT), liquid crystal display, active matrix display, or plasma display, for displaying information to a computer user. An input device 1613, such as a keyboard including alphanumeric and other keys, is coupled to the bus 1601 for communicating information and command selections to the processor 1603. Another type of user input device is cursor control 1615, such as a mouse, a trackball, or cursor direction keys for communicating direction information and command selections to the processor 1603 and for controlling cursor movement on the display 1611.

According to one embodiment of the invention, the various carrier synchronization processes can be provided by the computer system 1600 in response to the processor 1603 executing an arrangement of instructions contained in main memory 1605. Such instructions can be read into main memory 1605 from another computer-readable medium, such as the storage device 1609. Execution of the arrangement of instructions contained in main memory 1605 causes the processor 1603 to perform the process steps described herein. One or more processors in a multi-processing arrangement may also be employed to execute the instructions contained in main memory 1605. In alternative embodiments, hard-wired module may be used in place of or in combination with software instructions to implement the embodiment of the present invention. Thus, embodiments of the present invention are not limited to any specific combination of hardware module and software.

The computer system 1600 also includes a communication interface 1617 coupled to bus 1601. The communication interface 1617 provides a two-way data communication coupling to a network link 1619 connected to a local network 1621. For example, the communication interface 1617 may be a digital subscriber line (DSL) card or modem, an integrated services digital network (ISDN) card, a cable modem, or a telephone modem to provide a data communication connection to a corresponding type of telephone line. As another example, communication interface 1617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1617 sends and receives electrical, electromagnetic, or optical signals that carry digital data streams representing various types of information. Further, the communication interface 1617 can include peripheral interface devices, such as a Universal Serial Bus (USB) interface, a PCMCIA (Personal Computer Memory Card International Association) interface, etc.

The network link 1619 typically provides data communication through one or more networks to other data devices. For example, the network link 1619 may provide a connection through local network 1621 to a host computer 1623, which has connectivity to a network 1625 (e.g. a wide area network (WAN) or the global packet data communication network now commonly referred to as the "Internet") or to data equipment operated by service provider. The local network 1621 and network 1625 both use electrical, electromagnetic, or optical signals to convey information and instructions. The signals through the various networks and the signals on network link 1619 and through communication interface 1617, which communicate digital data with computer system 1600, are exemplary forms of carrier waves bearing the information and instructions.

The computer system 1600 can send messages and receive data, including program code, through the network(s), network link 1619, and communication interface 1617. In the Internet example, a server (not shown) might transmit requested code belonging to an application program for implementing an embodiment of the present invention through the network 1625, local network 1621 and communication interface 1617. The processor 1603 may execute the transmitted code while being received and/or store the code in storage device 169, or other non-volatile storage for later execution. In this manner, computer system 1600 may obtain application code in the form of a carrier wave.

The term "computer-readable medium" as used herein refers to any medium that participates in providing instructions to the processor 1603 for execution. Such a medium may take many forms, including but not limited to non-volatile media, volatile media, and transmission media. Non-volatile media include, for example, optical or magnetic disks, such as storage device 1609. Volatile media include dynamic memory, such as main memory 1605. Transmission media include coaxial cables, copper wire and fiber optics, including the wires that comprise bus 1601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the various embodiments of the present invention provide an approach for achieving carrier synchronization in a digital broadcast and interactive system utilizing Low Density Parity Check (LDPC) codes and higher order modulation schemes. A physical layer frame includes a preamble and multiple code segments. In an exemplary embodiment, a unique word (UW) is optionally inserted before each of the code segments as a pilot block. The preamble (and optional pilot blocks) serve as a training block. The carrier synchronization process utilizes the training block to estimate carrier frequency and phase, and reinitialize the phase tracking loop for each new segment. The frequency acquisition process involves computing an autocorrelation of a data-removed continuous wave (CW) signal. The carrier frequency of the received signal is estimated based on a weighted sum of the unwrapped phase of the accumulated autocorrelation values. With respect to frequency tracking, a feed-forward structure is implemented to generate estimates and to update the carrier frequency once per LDPC frame based on the phase estimates from the training block (i.e., preamble and/or UW). For phase tracking, a Two-Sweep Phase Locked Loop (PLL) architecture with a Maximum Likelihood (ML) phase detector is utilized. The Two-Sweep PLL tracks carrier phase on a segment by segment basis to estimate carrier phase based on both the past and future samples by sweeping the segment of data from both the forward and reverse directions. A segment can be a whole FEC codeword when no pilot blocks present, or a code segment with the pilot blocks inserted. The above arrangement advantageously reduces the need to introduce additional overhead for carrier synchronization, and significantly reduces the cycle slip rate and limits its error-propagating impact. The described arrangement also operates well in low SNR environments, providing good immunity against thermal noise and phase noise. Additionally, the frequency estimation process provides a large frequency acquisition range and short acquisition time. Accordingly, the above approach advantageously provides fast and efficient carrier synchronization.

While the present invention has been described in connection with a number of embodiments and implementations, the present invention is not so limited but covers various obvious modifications and equivalent arrangements, which fall within the purview of the appended claims.

What is claimed is:

1. A method of providing carrier synchronization in a digital broadcast and interactive system, the method comprising:
   receiving a frame transmitted according to a carrier signal, wherein the frame includes one or more segments separated by a plurality of overhead fields, and the overhead fields include a pilot block that is selectively inserted into the frame to aid carrier synchronization of the carrier signal;
   generating estimated phase values associated with the carrier signal based on the overhead fields, wherein the overhead fields include preambles, the preambles being modulated according to different modulation schemes;
   estimating phase of the carrier signal associated with a random data field within the segment based upon the estimated phase values of the overhead fields and upon past samples of the carrier signal and future samples of the carrier signal, wherein the segment includes information encoded according to Low Density Parity Check (LDPC) coding; and
   estimating frequency of the carrier signal based upon the overhead fields or the random data field,
   wherein the estimating steps are performed on the frame on a segment by segment basis.

2. A method according to claim 1, wherein the pilot block is independent of the random data field.

3. A method according to claim 2, wherein the pilot block exhibits a pattern that is based upon a continuous wave (CW) signal scrambled according to a predetermined sequence.

4. A method according to claim 1, wherein the pilot block has a length of 36 symbols, and the segment has a length of 1440 symbols.

5. A method according to claim 1, wherein the pilot block is inserted at a transmitter configured to send the transmitted frame and to perform the steps of:
   determining whether a pilot insertion position coincides with position of the preamble; and
   inserting the pilot block if the position is not designated for the preamble.

6. A method according to claim 5, further comprising:
   waiting for a predetermined number of symbols, wherein the predetermined number of symbols corresponds to length of the segment.

7. A method according to claim 1, wherein the random data field has symbols specified by a modulation scheme including one of Binary Phase Shift Keying (BPSK), Quadrature Phase Shift Keying (QPSK), 8PSK, 16 Amplitude Phase Shift Keying (APSK), 32APSK, and a high order Quadrature Amplitude Modulation (QAM).

8. A method according to claim 1, wherein the frame is transmitted over a satellite communication channel.

9. A method according to claim 1, wherein the carrier signal is transmitted in continuous mode transmission.

10. A method according to claim 1, further comprising:
    obtaining a continuous wave (CW) signal corresponding to the overhead fields;
    computing a plurality of autocorrelation values associated with the CW signal;
    accumulating the autocorrelation values over the segments; and
    outputting the frequency of the carrier signal based upon a weighted sum of an unwrapped phase of the accumulated autocorrelation values.

11. A method according to claim 10, wherein the CW signal is obtained according to:

$$x_k p^*_k,$$

where $x_k$ is corresponding to the overhead field, $p_k$ is a known pattern related to the overhead field, and * is a complex conjugate operation.

12. A method according to claim 10, wherein the autocorrelation values are based on the overhead fields over a plurality of frames, and are obtained, per frame, according to $$R_f(m) = \sum_{s=0}^{N_p} \sum_{k=0}^{n-1} (x^f_{s,k+m} p^{f*}_{s,k+m})(x^f_{s,k} p^{f*}_{s,k})^*, m = 1, \ldots, L$$

where f is a frame index, s is an overhead field index, $N_p$ is the number of overhead fields in one frame, k is the symbol index, $x_k$ corresponds to overhead field, $p_s$ is a known training symbol, wherein the computed autocorrelation values are accumulate over the plurality of frames according to $$R(m) = \sum_{f=0}^{N-1} R_f(m).$$

13. A method according to claim 12, wherein the frequency of the carrier signal is output according to:

$$\Delta \hat{f} = \frac{1}{2\pi T_s} \sum_{m=0}^{L-1} w_m \Delta(m)$$

$$w_m = \frac{3[(2L+1)^2 - (2m+1)^2]}{[(2L+1)^2 - 1](2L+1)}, m = 0, \ldots, L-1,$$

where $T_s$ is the symbol period, and $$\Delta(m) = \begin{cases} \arg[R(1)], m = 0 \\ \mod[\arg(R(m+1)) - \arg(R(m)), 2\pi], m = 1, \ldots, L-1. \end{cases}$$

14. A method according to claim 10, the method further comprising:
estimating carrier phase value of each of the overhead fields within the frame; and
computing the frequency based on a weighted sum of the unwrapped estimated carrier phase values.

15. A method according to claim 14, wherein the estimated carrier phase value of the overhead field is based on:

$$\phi_n = \arg\left[\sum_{k=0}^{N_u-1} x_k p^*_k\right],$$

where $x_k$ is a received symbol associated with the overhead field, $P_k$ is a known pattern in the overhead field, $N_u$ is the length of the overhead field.

16. A method according to claim 15, wherein the frequency of the carrier signal is estimated once per frame as follows:

$$\Delta \hat{f} = \frac{1}{2\pi(N_s + N_u)T_s} \sum_{m=0}^{M-1} w_m \mod[\phi_{m+1} - \phi_m, 2\pi]$$

$$w_m = \frac{3[(2M+1)^2 - (2m+1)^2]}{[(2M+1)^2 - 1](2M+1)}, m = 0, \ldots, M-1,$$

where M is the number of overhead fields in one frame.

17. A method according to claim 1, further comprising:
obtaining a coarse frequency estimate based on the overhead fields over one or more frames;
applying the coarse frequency estimate to a front end mixer to correct frequency offset of received signals; and
tracking a residue frequency using a frequency estimate obtained from one of the overhead fields and the random data field, once per frame.

18. A method of providing carrier synchronization in a digital broadcast and interactive system, the method comprising:
receiving a frame transmitted according to a carrier signal, wherein the frame includes one or more segments separated by a plurality of overhead fields, and the overhead fields include a plurality of pilot blocks that are selectively inserted into the frame to aid carrier synchronization of the carrier signal
generating estimated phase values associated with the carrier signal based on the overhead fields;
estimating phase of the carrier signal associated with a random data field within the segment based upon the estimated phase values of the overhead fields and upon past samples of the carrier signal and future samples of the carrier signal, wherein the overhead fields further include preambles and the pilot blocks correspond to the respective segments, and for each of the segments, the estimated carrier phase values of the overhead fields correspond to a beginning and an end of the segment;
estimating frequency of the carrier signal based upon the overhead fields or the random data field, wherein the estimating steps are performed on the frame on a segment by segment basis;
estimating an instantaneous carrier frequency from the estimated carrier phase values based on the overhead fields;
for each of the segments, performing a forward phase sweep over the random data field of the segment using a phase lock loop (PLL) initialized with the estimated carrier phase value from the overhead fields at the beginning of the segment;
for each of the segments, performing a reverse sweep over the random data field of the segment using a phase lock loop (PLL) initialized with the estimated carrier phase value from the overhead fields at the end of the segment and the instantaneous carrier frequency, wherein the instantaneous carrier frequency is removed before the forward sweep and the reverse sweep;
determining whether the forward sweep or the reverse sweep is in synchronization; and
computing final carrier phase estimates over the random data field by combining the instantaneous carrier frequency value, the forward sweep phase estimates, and the reverse sweep phase estimates.

19. A method according to claim 18, wherein the estimated carrier phase values of the overhead fields are based on $$\phi_n = \arg\left[\sum_{k=0}^{N_u-1} x_k p_k^*\right],$$

where $x_k$ is a received symbol associated with the overhead field, $p_k$ is a known pattern in the overhead field, $N_u$ is the length of the overhead field, the instantaneous frequency estimate being determined according to $$\hat{\omega} = \frac{\phi_{n+1} - \phi_n}{N_s + N_u},$$

where $\phi_{n+1}$ and $\phi_n$ are the phase estimates from the overhead fields at the beginning and the end, respectively, of the corresponding segment, and $N_s$ is the length of the segment within the frame, wherein $\phi_{n+1}$ first goes through a phase unwrap operation before the instantaneous frequency estimation, which is given by $$\phi_{n+1} = \phi_{n+1} + 2\pi \times \text{floor}\left(\frac{\phi_n - \phi_{n+1} + \pi}{2\pi}\right),$$

where floor(x) rounds x to the nearest integer towards minus infinity.

20. A method according to claim 19, wherein the final phase estimates, $\hat{\theta}(m)$, are computed according to:

$$\hat{\theta}(m) = \left(\theta_f(m) + \theta_r(m) + 2\pi \times \text{floor}\left(\frac{\theta_f(m) - \theta_r(m) + \pi}{2\pi}\right)\right)/2 + \hat{\omega}m,$$

$m = 0, \ldots, N_s - 1,$ where $\theta_f(m)$ and $\theta_r(m)$ are, respectively, the forward sweep phase estimates and the reverse sweep phase estimates.

21. A method of providing carrier synchronization in a digital broadcast and interactive system, the method comprising:
receiving a frame transmitted according to a carrier signal, wherein the frame includes one or more segments separated by a plurality of overhead fields,
wherein the overhead fields include preambles without a pilot block being inserted;
generating estimated phase values associated with the carrier signal based on the overhead fields;
estimating phase of the carrier signal associated with a random data field within the segment based upon the estimated phase values of the overhead fields and upon past samples of the carrier signal and future samples of the carrier signal;
estimating frequency of the carrier signal based upon the overhead fields or the random data field, wherein the estimating steps are performed on the frame on a segment by segment basis;
estimating carrier phase values of the preambles associated with the beginning and the end of the segment, wherein the preamble at the end corresponds to a next frame;
performing a forward phase sweep over the random data field of the frame using a phase lock loop (PLL) initialized with the estimated carrier phase value from the preamble at the beginning of the frame;
performing a reverse phase sweep over the random data field of the frame using a phase lock loop (PLL) initialized with the estimated carrier phase value from the preamble at the beginning of the next frame;
determining whether the forward sweep or the reverse sweep is in synchronization; and
in response to the determining step, computing a final carrier phase estimate by combining the forward sweep phase estimates and the reverse sweep phase estimates.

22. A method according to claim 21, wherein the PLL includes a phase detector based on a maximum likelihood (ML) rule, and the estimated phase value is computed as follows:

$$\hat{\theta}_k = Im(x_k \hat{d}_k^*),$$

where $x_k$ is a received symbol, $\hat{d}_k$ is a soft estimate of the transmitted data symbol $d_k$, $$\hat{d}_k = \frac{\sum_{m=0}^{M-1} e^{\frac{\|x_k - c_m\|^2}{2\sigma^2}} c_m}{\sum_{m=0}^{M-1} e^{\frac{\|x_k - c_m\|^2}{2\sigma^2}}},$$

M is a dimension of modulation, $c_m = e^{j(2\pi m/M + \pi/M)}$ is constellation point; $\sigma^2$ is Additive White Gaussian Noise (AWGN) variance, and * is a complex conjugate operation.

23. A method according to claim 21, further comprising:
determining whether the forward sweep and the reverse sweep is out of synchronization; and
if the forward sweep or the reverse sweep is not out of synchronization, computing a carrier frequency offset value from a difference of the final phase estimates at the start and at the end of the frame.

24. A method according to claim 23, wherein the frequency estimate is determined by:

$$\hat{f}_e = \frac{\hat{\theta}(N_s - 1) - \hat{\theta}(0)}{2\pi T_s N_s},$$

where $\hat{f}_e$ is the frequency estimate, $\hat{\theta}(n)$ is the final phase estimate on the random data field, $N_s$ is the length of the segment, and $T_s$ is the symbol period.

25. A method according to claim 23, further comprising:
computing a phase error at the end of one sweep by calculating a difference between the phase estimate obtained from the PLL at the end of sweep and the phase estimate value obtained from the overhead field adjacent to that end of the segment;
unwrapping the phase error; and
comparing the unwrapped phase error to a threshold; and
determining that the phase sweep is in synchronization if the unwrapped phase error is less than the threshold.

26. A method according to claim 1, further comprising:
after achieving carrier synchronization, demodulating the carrier signal according to one of Binary Phase Shift Keying (BPSK), Quadrature Phase Shift Keying (QPSK), 8PSK, 16 Amplitude Phase Shift Keying (APSK), 32 APSK, and a high order Quadrature Amplitude Modulation (QAM).

27. A method according to claim 26, further comprising:
decoding the demodulated signal according to an Low Density Parity Check (LDPC) decoding process.

28. A method for providing carrier synchronization in support of digital broadcast and interactive services over a satellite network, the method comprising:
receiving a Low Density Parity Check (LDPC) coded frame over a satellite communication channel, the frame including a preamble and a plurality of code segments having corresponding unique words as training symbols;
estimating phase information corresponding to the frame based upon one of the preamble, the unique words, and a combination of the preamble and the unique words, wherein the estimated phase information is determined according to $$\phi_n = \arg\left[\sum_{k=0}^{N_u-1} x_k p_k^*\right],$$

where $x_k$ is a received symbol associated with the frame, $p_k$ is a known pattern of the unique word or the preamble, and $N_u$ is the length of the unique word or the preamble;
estimating frequency information corresponding to the frame based upon the estimated phase;
initializing a two-sweep phase locked loop (PLL) with $\phi_n$; and
outputting a final phase estimate, $\hat{\theta}(m)$, according to $$\hat{\theta}(m) = \left(\theta_f(m) + \theta_r(m) + 2\pi \times \text{floor}\left(\frac{\theta_f(m) - \theta_r(m) + \pi}{2\pi}\right)\right)/2 + \hat{\omega}m,$$

$$m = 0, \ldots, N_s - 1,$$

where $\theta_f(m)$ and $\theta_r(m)$, are, respectively, forward sweep phase estimates and reverse sweep phase estimates.

29. A method according to claim 28, wherein the estimated frequency information is determined according to $$\Delta \hat{f} = \frac{1}{2\pi(N_s + N_u)T_s} \sum_{m=0}^{13} w_m \text{mod}[\phi_{m+1} - \phi_m, 2\pi]$$

$$w_m = \frac{3[(2L+1)^2 - (2m+1)^2]}{[(2L+1)^2 - 1](2L+1)}, m = 0, \ldots, L-1$$

where $N_s$ is the length of the code segment, and L is based on the number of code segments.

* * * * *